United States Patent [19]

Karp et al.

[11] 3,778,784

[45] Dec. 11, 1973

[54] MEMORY SYSTEM INCORPORATING A MEMORY CELL AND TIMING MEANS ON A SINGLE SEMICONDUCTOR SUBSTRATE

[75] Inventors: Joel A. Karp; William M. Regitz, both of Cupertino, Calif.

[73] Assignee: Intel Corporation, Santa Clara, Calif.

[22] Filed: Feb. 14, 1972

[21] Appl. No.: 225,829

[52] U.S. Cl. .............. 340/173 R, 307/238, 307/279, 340/173 FF

[51] Int. Cl. .............. G11c 11/40

[58] Field of Search .............. 307/238, 279; 340/173 FF, 173 R

[56] References Cited

UNITED STATES PATENTS 3,576,571 4/1971 Booker .............. 340/173 R

*Primary Examiner*—Terrell W. Fears

[57] ABSTRACT

A memory system is disclosed wherein the system may be controlled by providing a single clock signal to an array of memory cells on a monolithic semiconductor substrate. The substrate includes a timing generator means. The controlling of a memory array by a single clock contributes to the practical attainment of an ingrated circuit wherein a higher density of memory cells is formed. To accomplish this, in addition to the timing generator means, a timing cell is formed on the same substrate wherein the memory cells are formed.

23 Claims, 24 Drawing Figures

PATENTED DEC 11 1973 3,778,784

SHEET 07 OF 12

MEMORY SYSTEM INCORPORATING A MEMORY CELL AND TIMING MEANS ON A SINGLE SEMICONDUCTOR SUBSTRATE

BACKGROUND OF THE INVENTION

It has been recognized in the semiconductor industry that, in many applications such as integrated circuit memories, it is important, from a cost-performance standpoint, that high component densities can be achieved. The reason that high component densities are important is readily apparent when it is appreciated that all of the components on an integrated circuit are simultaneously chemically formed and that the yield, as to a particular integrated circuit product, is only slightly, if at all, affected by the density of components formed in a monolithic semiconductor substrate.

In connection with integrated circuit memory products and random access memories in particular, the information to be stored is stored in what is referred to as a cell. These cells, in integrated circuits, are commonly formed by a number of MOS devices having a number of interconnect buses to each cell and a number of connections thereto. It should be understood that the term "MOS-device" is employed herein in a generic sense to refer to any device, regardless of the particular technology employed to form that device, that is metal gate, silicon gate, silicon nitride, alumina, etc., wherein at least a gate and a channel with interconnects to at least two points on said channel are employed. There has been a considerable effort to minimize the number of MOS devices employed in a given cell and to also minimize the number of buses and connections to a cell. The result of minimizing such factors is to increase the density of cells that may be formed in a single integrated circuit monolithic semiconductor substrate. Thus, in U.S. Pat. No. 3,585,613, several memory cells are described. An attempt to further minimize such cell geometry and increase density was described in a paper entitled "Three Transistor Cell 1,024-Bit 500-ns MOS RAM," published in the IEEE Journal of Solid State Circuits, Vol. SC-5, No. 5, Oct. 1970, by the inventors of the subject patent application. A further step in minimizing cell geometry and the number of interconnect bars and connections to a cell is disclosed in U.S. Patent application Ser. No. 180,987, filed Sept. 16, 1971, by Leslie L. Vadasz and Joel L. Karp, and assigned to the assignee of the subject patent application. The memory cell described in the pending patent application is the preferred memory cell to be employed in the memory system described hereinafter, but other cells may be employed.

In memory cells, such as those described in the above-mentioned patent and in the above-mentioned paper, there are employed a plurality of external timing signals to control and operate each memory cell. For example, there has been employed clock signals referred to as "X-enable," "Y-enable" and "pre-charge." All of these clock signals and others are supplied from a source outside of the monolithic substrate, and each of these signals must be precisely timed and configured with respect to one another. Typical specifications regarding the time pulses supplied to an integrated circuit memory cell are provided by the integrated circuit manufacturer and are typified by such published specifications as that issued by Intel Corporation, entitled "MOS LSI Memory 1,103-Fully Decoded Random Access 1,024-Bit Dynamic Memory." The providing of a plurality of timing signals for a single monolithic substrate with singular defined parameters may present no significant problem. However, the providing of a plurality of timing signals to an integrated memory circuit wherein each monolithic substrate varies in its specific parameters within defined tolerances poses a significant technical problem. As the tolerances of acceptability on a specification for a particular integrated circuit memory device are broadened, then the specification on the timing signals to be supplied for such monolithic substrate becomes extremely difficult if, at all, realizable. Conversely, as the specification on an integrated memory circuit device is specified as to very, very narrow limits, the production of useful devices becomes an uneconomical situation. This entire problem is further compounded by increasing the number of devices within a defined monolithic substrate area and by increasing the monolithic substrate area. Such increases in size and complexity further increase the time variances attendant to providing a clock pulse to each cell at the appropriate time. The problem is further complicated in that it is the customer and user of the integrated circuit memory that must supply these timing signals and, thus, the customer has additional restraints placed on the design of the overall system employing such integrated memory circuits. These externally supplied clock signals have tolerances associated therewith. These tolerances tend to limit the performance (e.g., speed) of the memory system.

The above problems, with the prior art devices, become more apparent by a review of the prior art which, in addition to the above-mentioned patent and article, includes U.S. Pat. No. 3,355,721, issued to J. R. Burns on Nov. 28, 1967; U.S. Pat. No. 3,493,786, issued to R. W. Ahrons, et al. on Feb. 3, 1970; U.S. Pat. No. 3,514,765, issued to A. O. Christensen on May 26, 1970; U.S. Pat. No. 3,585,613, issued to Thomas L. Palfi on June 15, 1971; U.S. Pat. No. 3,576,571, issued to Robert K. Booher on Apr. 27, 1971; U.S. Pat. No. 3,387,286, issued to R. H. Dennard on June 4, 1968; U.S. Pat. No. 3,364,362, issued to R. N. Mellott on Jan. 16, 1968; U.S. Pat. No. 3,518,635, issued to R. H. Cole, et al. on June 30, 1970; "Getting More Speed from MOS," Electronics, Feb. 17, 1969; "MOS Random Access Memories," by Burton R. Tunzi, Electronics, Jan. 20, 1969, and " Silicon Gate Dynamics MOS Crams 1,024-Bits on a Chip," Electronics, Aug. 3, 1970, pp. 68–73, by Marcian Hoff.

BRIEF DESCRIPTION OF INVENTION

The subject invention solves a number of the prior art problems, by incorporating a timing generator means integral with the memory cell array on a single monolithic semiconductor substrate. The timing generator means receives a single external signal which results in its generating a plurality of timing signals. In the preferred form of the invention, only a single timing signal is supplied to the semiconductor substrate containing the memory cell array. Thus, the user of the semiconductor memory cell array means no longer is required to provide a plurality of specified timing signals in order to operate the memory.

In addition to the timing generator means, a timing cell means is incorporated on the monolithic semiconductor substrate and this timing cell compensates the generated timing signals to account for the variations in memory cell operation. Further, additional time-compensating circuit means are included in other of the circuit functions so that the operation of these critically timed signals are adapted for variations, such as temperature and processing variables incident to the formation of the monolithic semiconductor memory. The result of incorporating these timing devices on the same monolithic substrate as the memory cell array is that the adjustment of the timing signals necessary to compensate for such variations is accomplished automatically without the imposition of restrictions on the system designer employing the memory array. Further, the control of the memory array becomes sufficiently accurate, notwithstanding process variations, that it becomes possible to use a tri-state signal to control the functioning of the memory cell. A tri-state signal, as the term is employed herein, is a signal having three levels which may be referred to as a first level, which is a low or "off" level; a second level, which is an intermediate level; and a third level, which is a high or "on" level. The capability of using such a signal, as provided by the present invention, enables the number of interconnecting buses and connections to a memory cell to be minimized, thereby facilitating the attainment of greatly increased densities. Further advantages accomplished by incorporating the timing control on the substrate is to enable the control of various devices so that minimum power dissipation is approached. Also, incorporating the timing generator on the substrate enables narrower tolerances to be maintained with respect to the timing signals thereby enabling memory system performance to be improved.

BRIEF DESCRIPTION OF FIGURES

A specific embodiment of the invention is described below with reference to the figures, wherein.

DETAILED DESCRIPTION OF EMBODIMENT OF INTENTION

Figure 1:
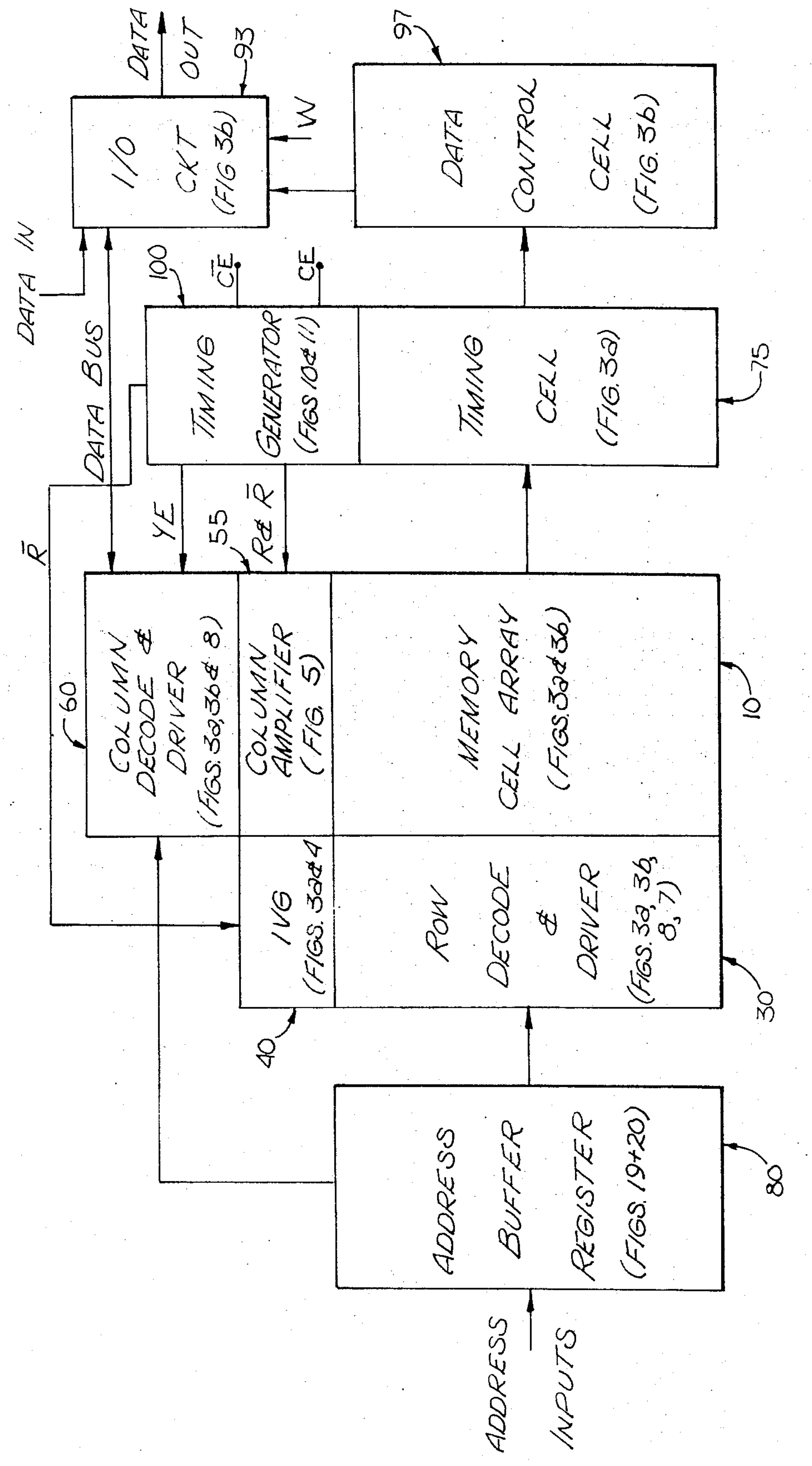
FIG. 1 is a generalized system diagram.

Referring to FIG. 1, there is shown a memory cell array 10 which, in the preferred embodiment, comprises a monolithic semiconductor substrate, including a plurality of memory cells wherein each cell is cabable of storing a bit of information. The memory cell, as well as all of the other circuits described herein, is in the preferred embodiment formed by MOS technology, particularly that technology relating to silicon gates. In addition to employing silicon gate MOS technology, it is preferred that the MOS devices be of an N-type channel construction. It is also preferred that the memory cell array be of the dynamic type, that is, the type wherein storage is dependent upon the charging of the parasitic capacitance associated with the silicon gate devices, and wherein the device discharges periodically and requires a refresh cycle. It is within the scope of the invention to employ other types of MOS devices and other types of cell operation.

Figure 3A:
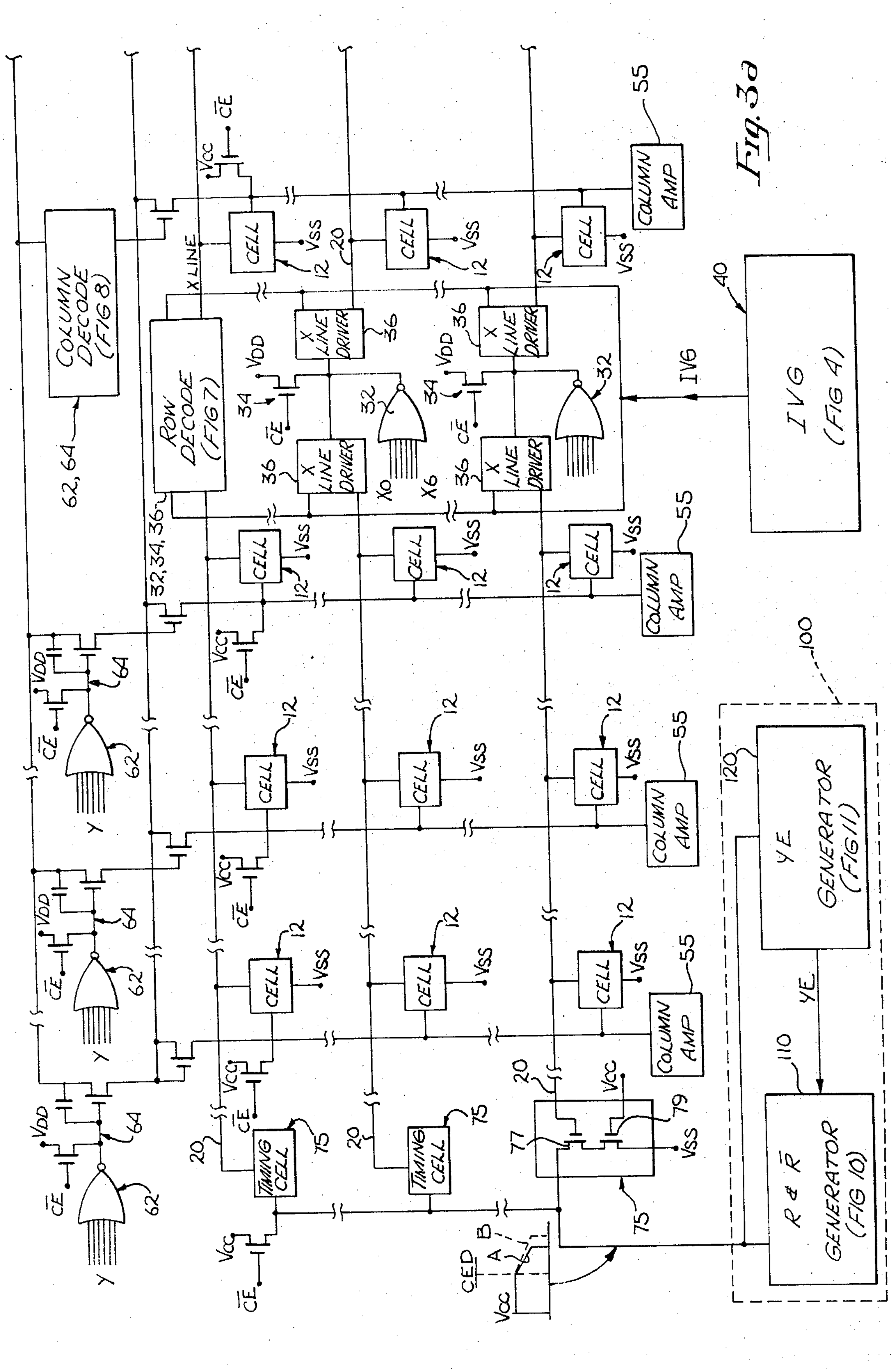
FIGS. 3*a* and 3*b* are detail system diagrams of the memory system.
Figure 3B:
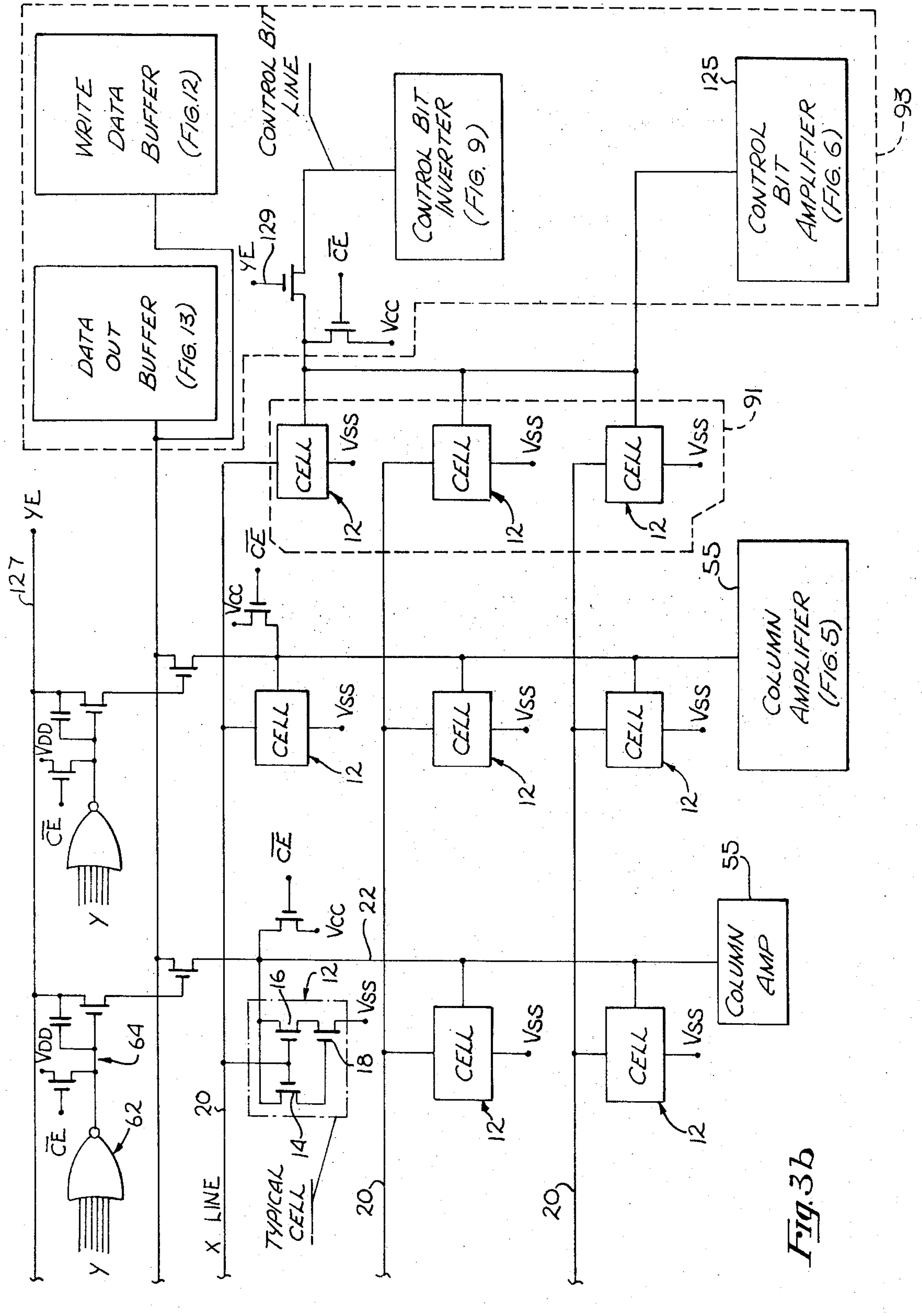

The memory cell array 10 comprises a plurality of memory cells which may be a few cells, but typically may range in excess of 1,024 cells and, in the preferred embodiment, is 4,096 cells arranged in a 64×64 array. The specific cell arrangement may include any number of transistors and interconnections; however, the preferred cell construction is as shown in U.S. Patent application Ser. No. 225,892, invented by Leslie Vadasz and Joel A. Karp, and assigned to the Assignee of the present Application. A typical cell construction 12 is shown in FIG. 3*b*, and includes three MOS devices 14, 16 and 18, interconnected as shown. The cell 12 is coupled to a single X or row line 20 which functions as a select line and a single column, or Y-line 22, which enables the transfer of information into and out of a cell during reading and writing.

For purposes of completeness, the operation of the cell 12 will be briefly discussed. To read information from the cell 12 (FIG. 3*b*), the terminal Vss is grounded while the column line 22 is precharged positively. A positive voltage is applied to the X-line 20. The magnitude of this voltage should not be large enough to cause device 14 to freely conduct, but rather only large enough to cause device 14 to partly conduct. If a charge has previously been stored on the parasitic capacitance associated with the gate of device 31, the drain of device 14 and the associated leads, device 31 will conduct. Since the positive voltage applied to the X-line is also applied to the gate of device 16, the device 16 will also conduct, causing the column line 22 to approach ground potential since a current path exists through devices 16 and 18 to ground. If no charge has been previously stored on the parasitic capacitance, device 18 will not conduct and the charge placed on the column line 22 will remain thereon.

Figure 4:
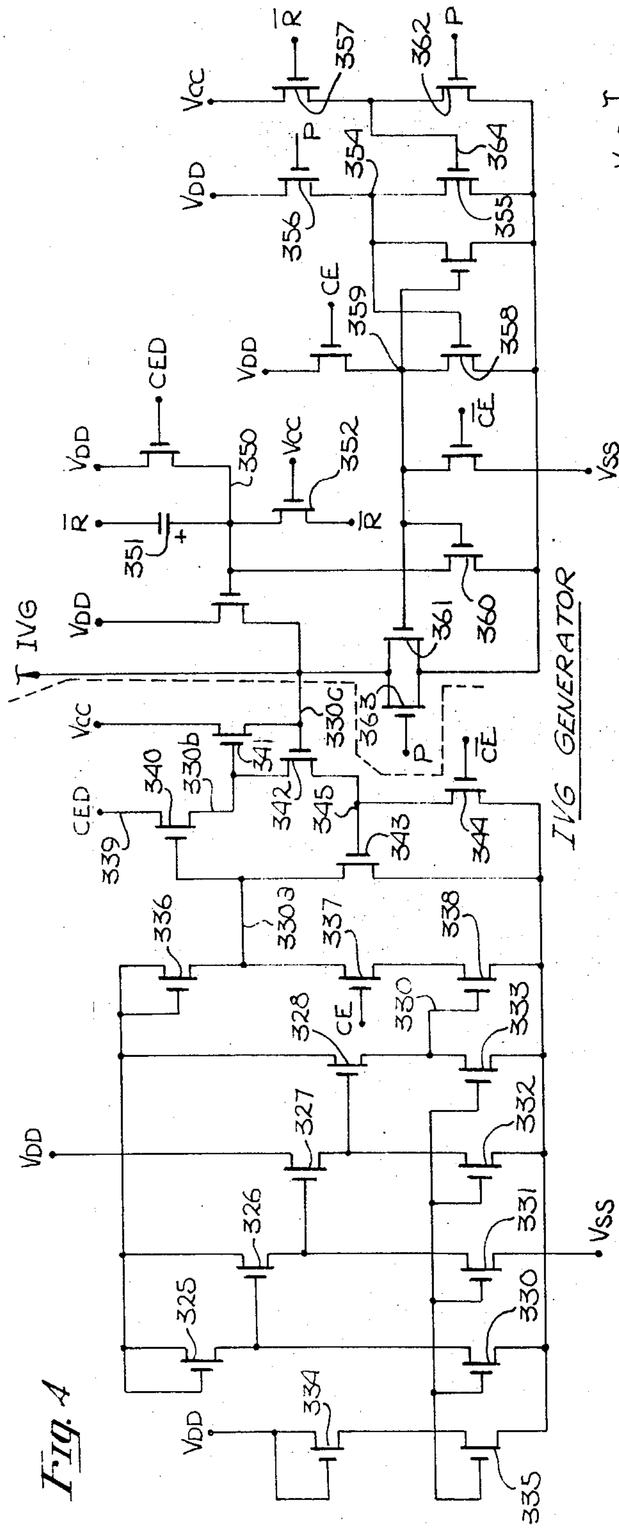
FIG. 4 is a detail circuit diagram of one embodiment of an IVG generator.

Note, that during the read cycle, when a charge previously has been stored on the parasitic capacitance, an undesirable current path exists from the capacitance to ground through devices 14, 16 and 18. If the read cycle is prolonged, or if device 14 is allowed to conduct too freely, the charge stored on the parasitic capacitance will be lost through the terminal Vss connected to ground. If this occurs, device 18 will be turned off, possibly before the charge is removed from the column line 22, thereby giving a false reading. In order to prevent this from happening, the voltage applied to the X-line 20 must be sufficiently controlled to only cause device 14 to partly conduct. This is accomplished by employing an intermediate voltage generator 40 (FIG. 3*a* and 4). The intermediate voltage generator provides a signal such as shown in FIG. **2A-(*f*), which is a tristate or three-level signal having low, intermediate and high voltage levels. It is the intermediate voltage level that is the carfully-controlled voltage referred to which enables device 30** to only partly conduct.

In connection with the cell, it should be noted that the intermediate level voltage is also applied to the gate of device 16. Since the source of device 16 is grounded for the described situation, device 16 will more readily conduct than device 18, even though the same voltage is applied to the gates of both devices. Thus, it is possible to read information from the cell, even though a portion of the charge on the parasitic capacitance is being lost during the read cycle. It should be understood that, in certain memory systems, it may be desirable to employ a compliment technique for information transfer. In such a situation, the charge in the cell is complimented, that is charge is converted into no charge, and no charge is converted into charge. In such a situation, depending on how the read cycle is defined, the remaining charge may be removed as soon as it is determined that a charge existed in the cell.

To write or store information in the cell, the information to be stored is placed on the column line 22 in the form of a positive voltage. Additionally, during the write cycle, a positive voltage of sufficient magnitude to cause device 14 to fully conduct is applied to the X-line 20. This voltage is shown as the high voltage in FIG. **2A-(*f*)**. During the write cycle, the terminal V*ss* is ground. When this occurs, current will flow through device 14 and positively charge the parasitic capacitance.

It should be understood that the above description of the cell operation is simplified for the purposes of explanation herein. In addition, the polarity of the voltages is of no critical consequence as voltages with opposite polarity may be employed for P-type devices.

Referring to FIG. 1, the X-lines 20, previously referred to, are, in general, part of the row decade and drivers 30, which form part of a decode means for generating a signal to select the addressed portion of the memory cell array 10. In addition to the row decode and driver 30, column decode and driver 60 form part of the decode means. Numerous forms of decode and drivers are well-known in the prior art. An arrangement for such decode means is shown in FIGS. 3*a* and 3*b*, taken in conjunction with FIGS. 7 and 8. The column decode 60 is shown in FIG. 3*a* as comprising the nor gates 62 with the associated circuitry 64. The nor gate 62, along with the associated circuitry 64, is shown in detail in FIG. 8, which is a circuit that may be employed in the present invention. The detailed operation of this circuit is not of specific importance to the invention, and may be understood by one of ordinary skill in the art from the circuit diagram. The column decode circuit is briefly described later in the specification. Similarly, the row decode comprises nor gates 32, and associated circuitry 34, which are, in turn, coupled to X-line drivers 36, coupled to drive X-lines 20 (FIG. 3*a*). The row decode, that is the nor gate, associated circuitry and driver, are shown in a typical form in FIG. 7. Although the row decode and column decode, in a specific sense, do not form part of this invention, they are briefly described later in the specification.

Figure 20:
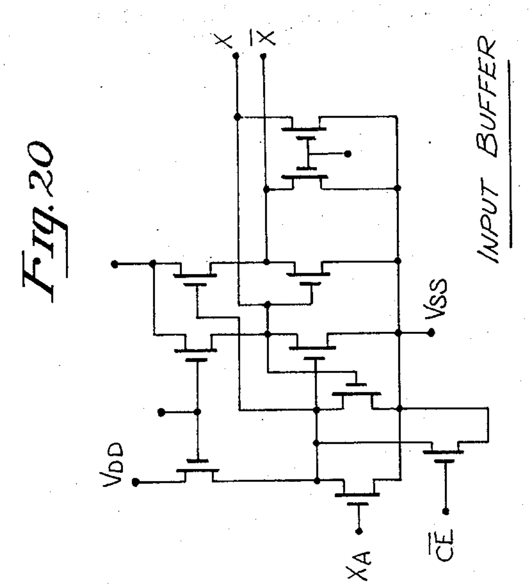
FIG. 20 is a detail circuit diagram of one embodiment of the buffer.

Referring to FIG. 1, the X and Y inputs to row decode and driver 30 and column decode and driver 60 are supplied by address buffer register means 80, which is coupled thereto. Address buffer registers are well-known in the art and a form of address buffer register is shown in FIG. 20. Thus, it can be seen address inputs are supplied to address buffer register 80 which, in turn, supplies input signals to row decode 30 and column decode 60, which, in turn, enable the desired memory cell to be accessed. It should be noted that the row decode 30 and column decode 60, along with the address buffer 80, are, in the preferred form of the invention, formed on a single monolithic substrate, which substrate also includes memory cell array 10.

Figure 17:
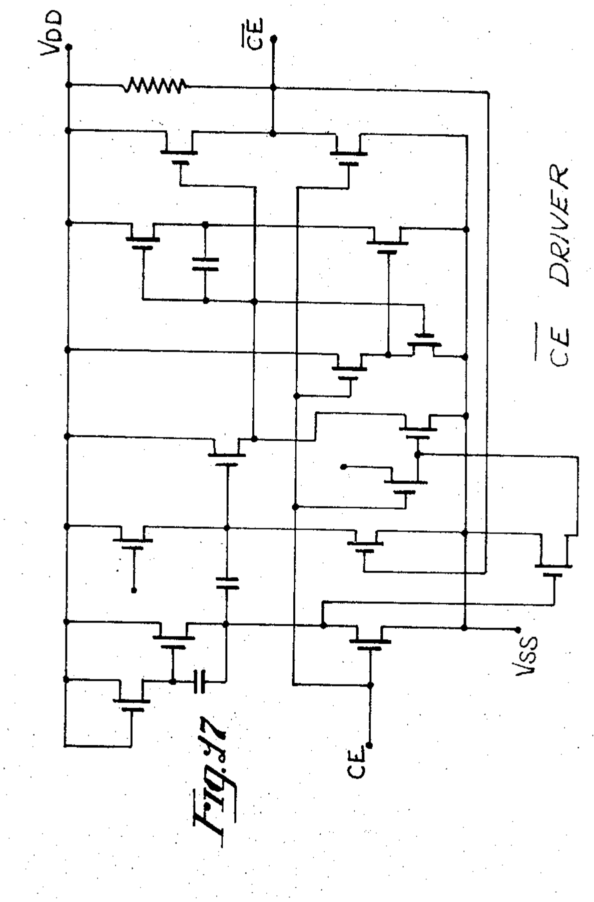
FIG. 17 is a detail circuit diagram of one embodiment of the $\overline{CE}$ driver.
Figure 18:
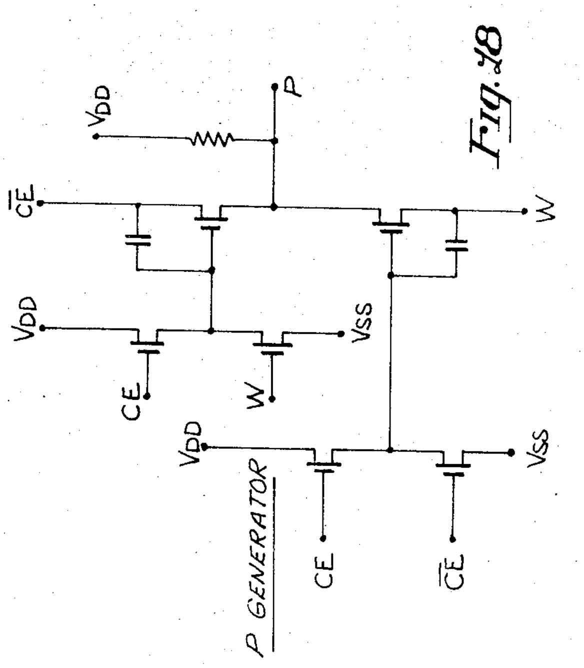
FIG. 18 is a detail circuit diagram of one embodiment of the "P" generator.

The operation of the memory system and, in particular, the memory cell array 10, column decode 60, row decode 30, intermediate voltage generator 40 and address buffer register 80 are controlled by timing generator 100. The timing generator 100 is shown generally in FIG. 1 and in greater detail in FIGS. 3*a*, 10 and 11. The timing generator 100 receives input signals designated CE and $\overline{\text{CE}}$, and a signal from timing cell 75. The signal CE, which may be referred to as the chip enable signal, is a single clock signal, provided from an external source. This is the only clock signal provided to the monolithic semiconductor substrate. The general form of the CE signal is shown in FIG. **2A-(*b*), both its leading and trailing edges are important in controlling the operation of the memory system. It is, of course, within the scope of the invention to employ additional circuits so that only one edge of the signal CE is important. The signal $\overline{\text{CE}}$ supplied to timing generator means, is an inverted CE signal and is formed by a $\overline{\text{CE}}$ driver which is typically shown in FIG. 17. The details of the $\overline{\text{CE}}$ driver circuit are, for the purposes of this invention, not important, but it is only important that an inverted $\overline{\text{CE}}$ signal be provided. As can be seen from FIG. 17,** the $\overline{\text{CE}}$ driver derives the $\overline{\text{CE}}$ signal from the CE signal input and the supply voltages for V*ss* and V*cc*. There are numerous other detail circuits that can provide this function.

The timing generator 100 supplies the output signals R, $\overline{\text{R}}$, and YE. The general configuration of the signals R and $\overline{\text{R}}$ is shown in FIGS. **2A-(*d*), and 2A-(*e*). The R and $\overline{\text{R}}$ signals are provided by R and $\overline{\text{R}}$ generator 110 (FIG. 3***a*), which is shown in one form in FIG. 10, and forms part of the timing generator 100. The R and $\overline{\text{R}}$ generator 100 is supplied with the inputs YE (Y-enable), CE, $\overline{\text{CE}}$ and W, all of these being signals generated on the monolithic semiconductor substrate, with the exception of the CE signal. The YE signal is supplied by the YE generator 120, shown generally in FIG.

Figure 11:
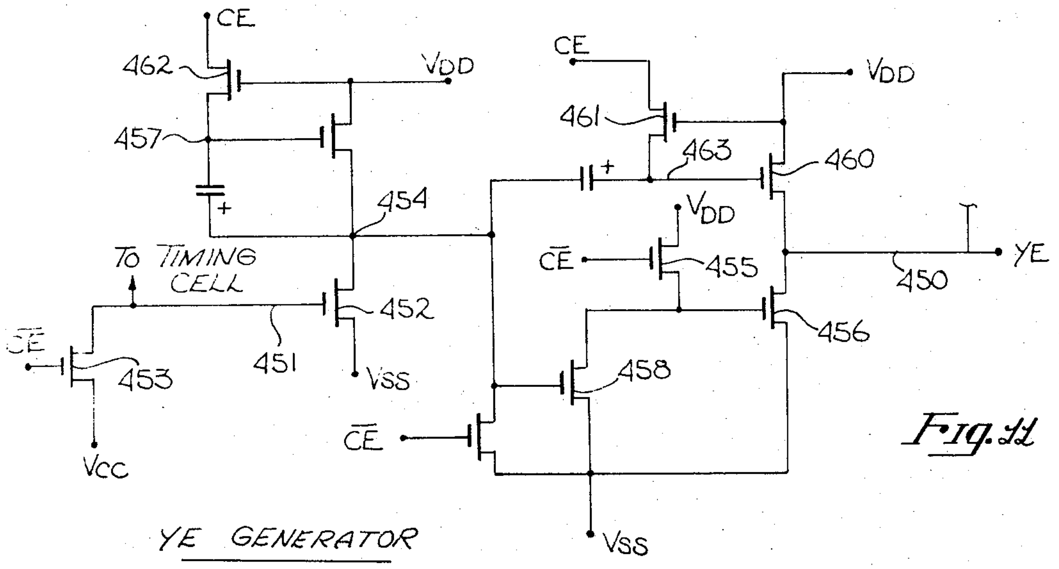
FIG. 11 is a detail circuit diagram of one embodiment of YE generator.
Figure 12:
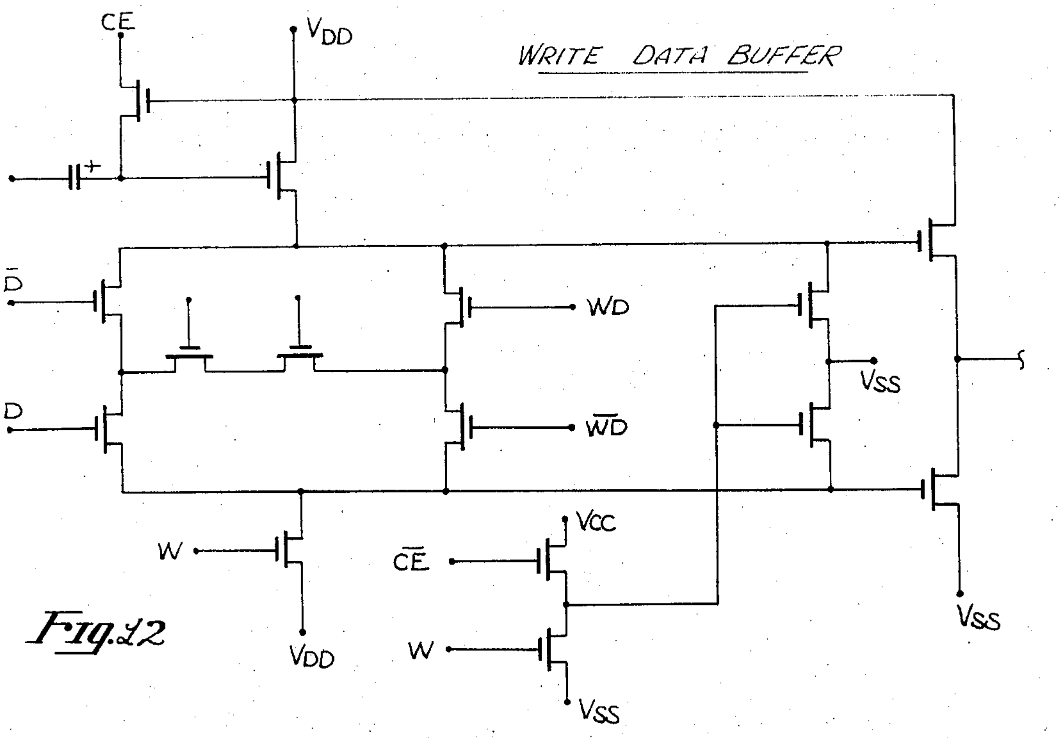
FIG. 12 is a detail circuit diagram of one embodiment of the write data buffer.
Figure 13:
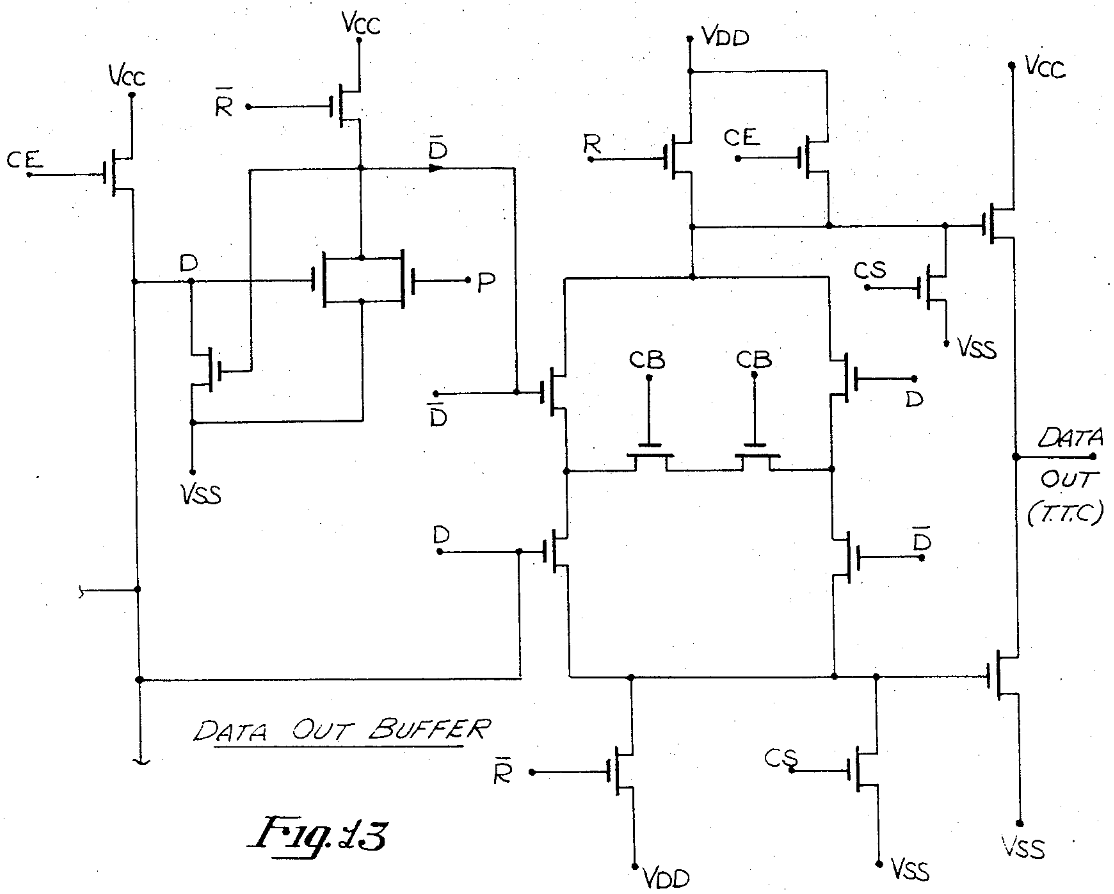
FIG. 13 is a detail circuit diagram of one embodiment of the data output buffer.
Figure 16:
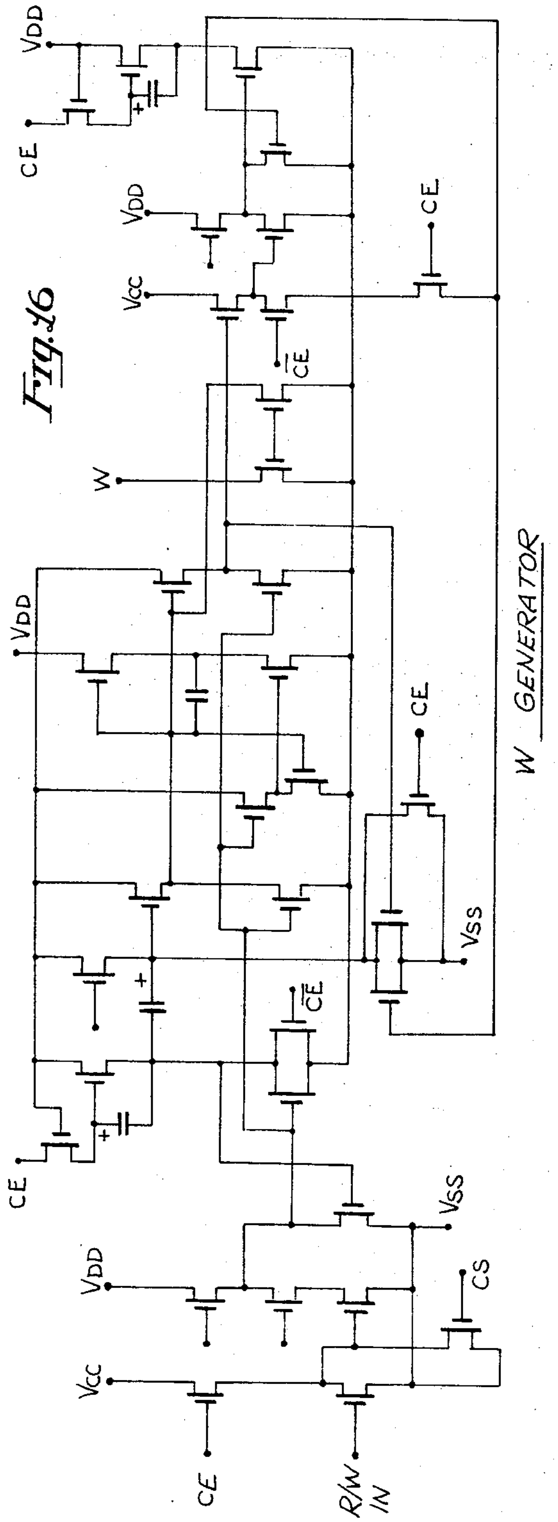
FIG. 16 is a detail circuit diagram of one embodiment of the W generator.

3*a*, and shown specifically in one form in FIG. 11. The YE generator 120 which forms part of the timing generator means 100 employs only the CE signal and the $\overline{CE}$ signal as input along with the inputs from the voltage sources. One of the outputs of the YE generator 120 is supplied to the R and $\overline{R}$ generator 110. The signal W is supplied by the W generator shown in one form in FIG. 16.

Figure 2A:
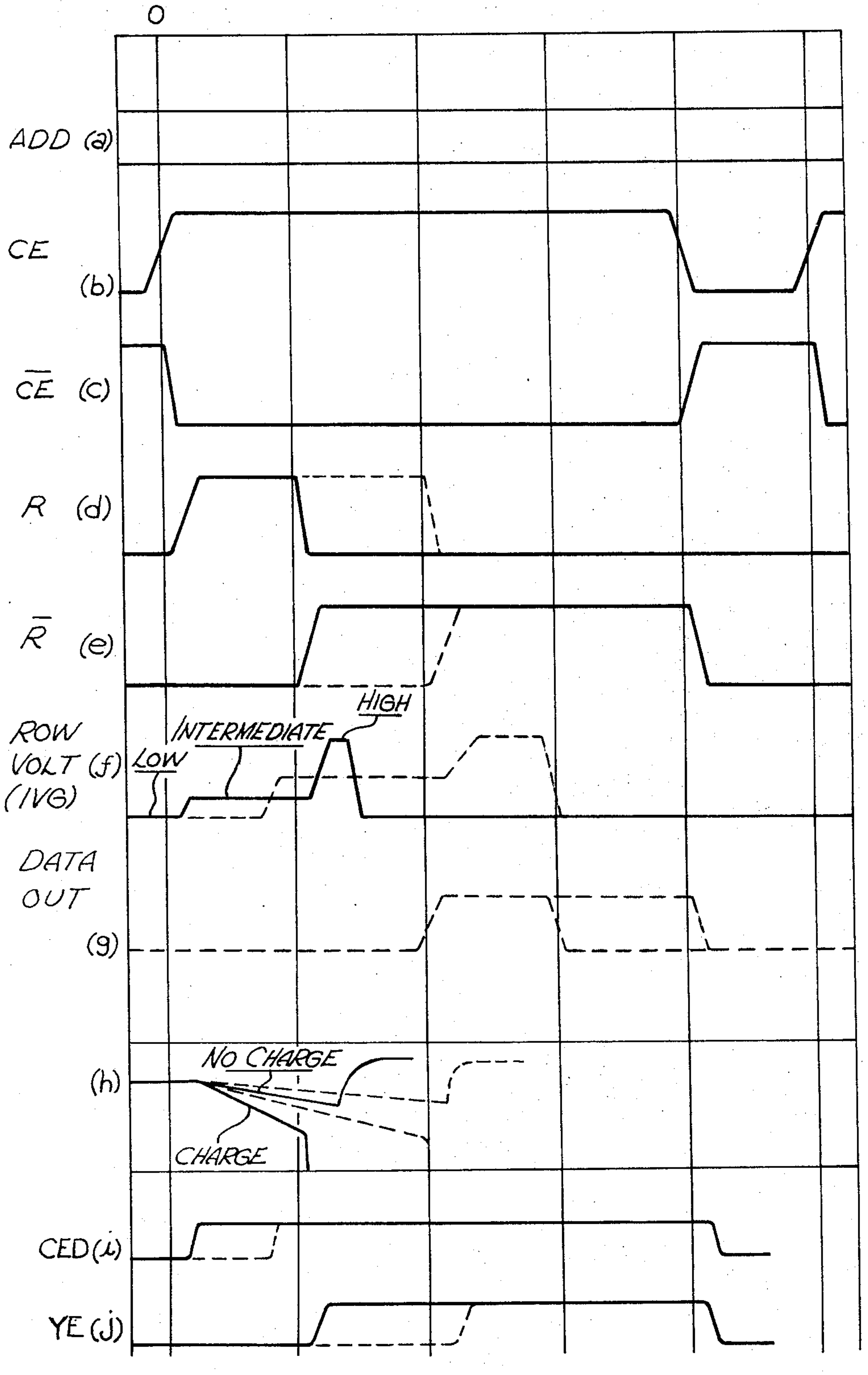
FIG. 2A is a timing diagram for the read cycle of operation of the memory system.
Figure 2B:
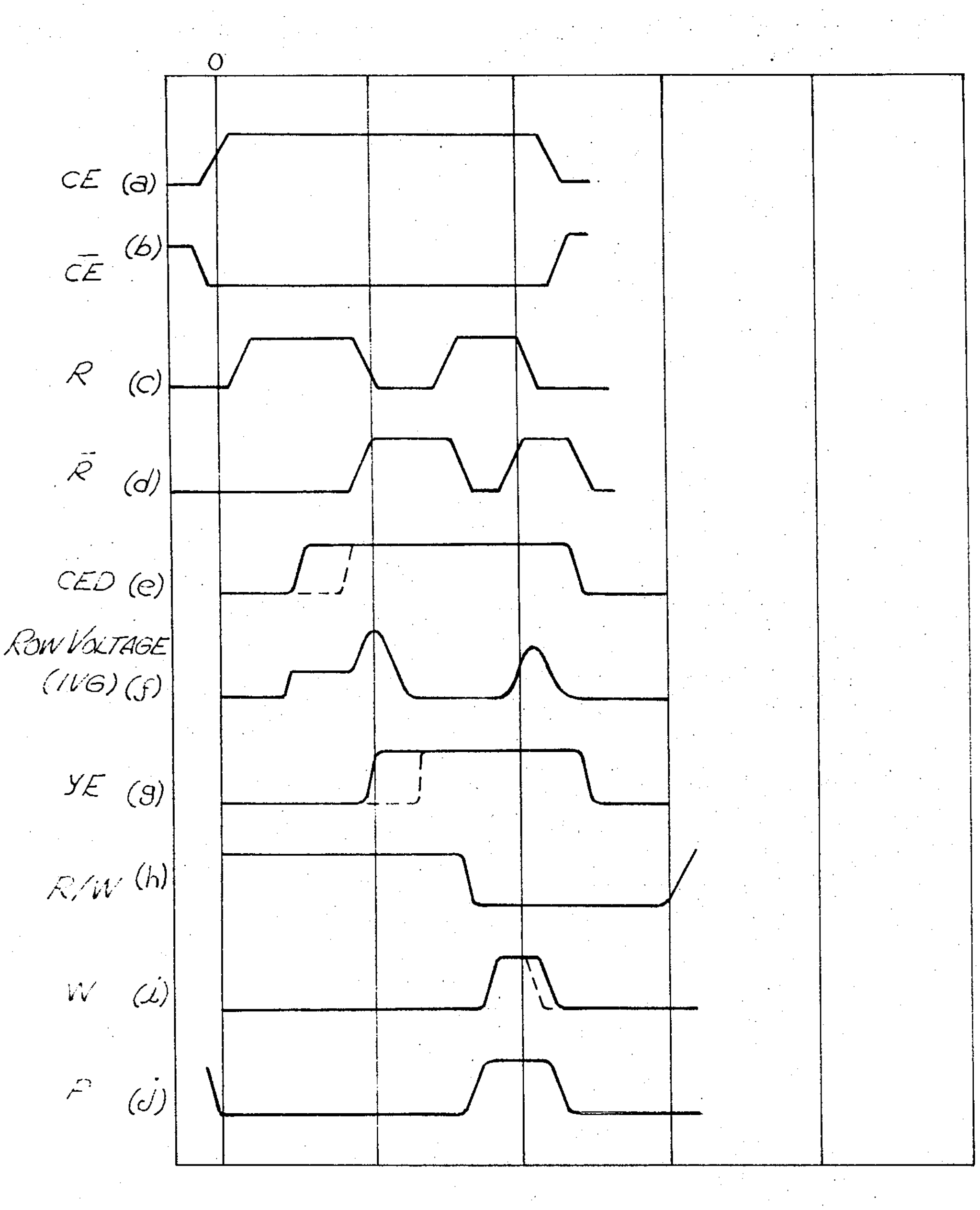
FIG. 2B is a timing diagram for the read modify write cycle of the memory system operation.
Figure 6:
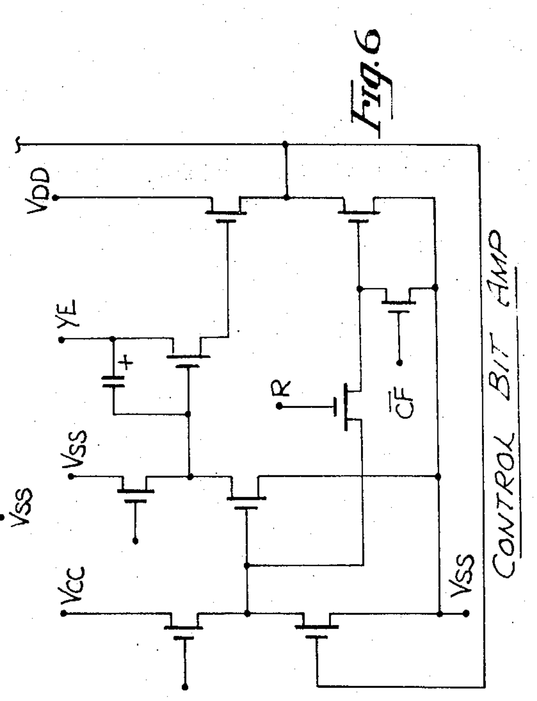
FIG. 6 is a detail circuit diagram of one embodiment of a control bit amplifier.

In general, the R and $\overline{R}$ signals are supplied to the column amplifier 55 to control the reading of the selected cell. The R signal facilitates the control bit amplifier 125 (FIG. 6) moving to a low level when there is a charge in the selected cell. The $\overline{R}$ signal is also supplied to the IVG generator 40 and enables the row voltage to move from the intermediate voltage to a high voltage (FIG. 2A). These signals are, of course, used in other of the functional circuits to facilitate the logical functioning and timing of the overall memory system. The output of the YE generator 120 is, in general, employed in connection with the functional circuits associated with the Y-column lines 22, such as the control bit amplifier 125 (FIG. 3*b*) which is shown in detail in one form in FIG. 6, the column decode line at 127 (FIG. 3*b*) and the control bit line at 129 (FIG. 3*b*). Thus, it can be seen that the timing generator comprises R and $\overline{R}$ generator 110, and YE generator 120, (along with other associated signal generators) provide timing signals R, $\overline{R}$ and YE which are the timing signals generated on the monolithic semiconductor substrate from the single clock signal CE and its inverted form $\overline{CE}$. There are, of course, other signals generated on the substrate that contribute to the overall timing and operation of the memory system as can be seen from FIGS. 2A and 2B. The signals in effect, during any particular cycle will be different as can be seen from a comparison of FIGS. 2A and 2B. FIG. 2A shows those signals that are particularly important during the read cycle while FIG. 2B shows those signals that are particularly important during the read-modify-write cycle. It should be noted that the signal W (from the W generator), and the signal R/W (an external information or logic signal as distinguished from an external timing signal) are added to this cycle. The presence of R/W signal enables the generation of the additional R and $\overline{R}$ signals, and W and IVG signals necessary for the modify-write.

Figure 14:
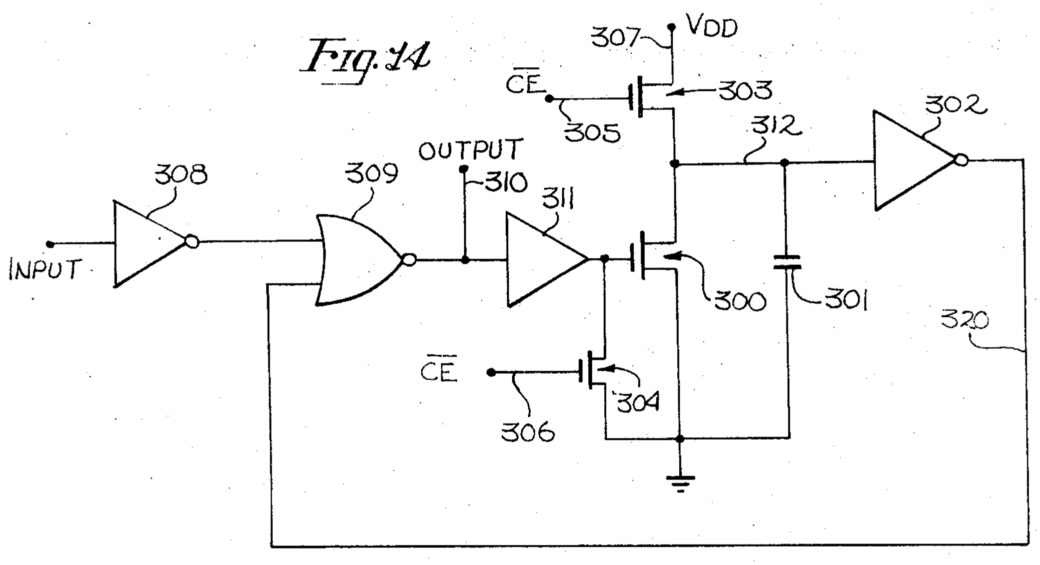
FIG. 14 is a detail circuit diagram of one embodiment of the timing compensating means.
Figure 19:
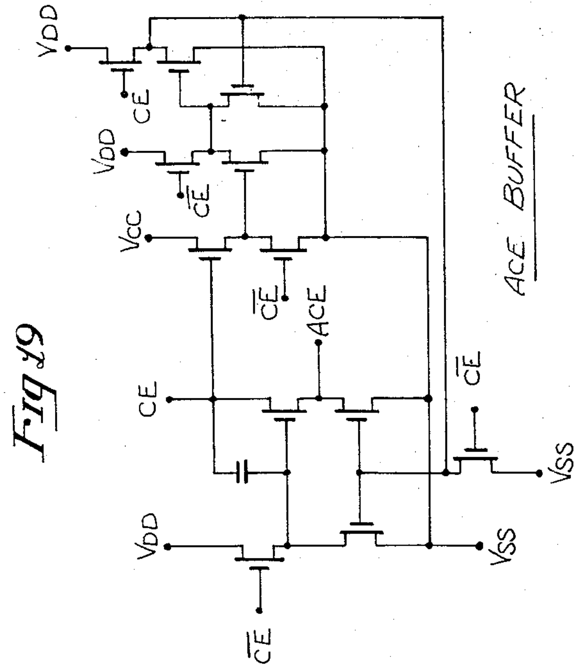
FIG. 19 is a detail circuit diagram of one embodiment of the Ace Buffer.
Figure 21:
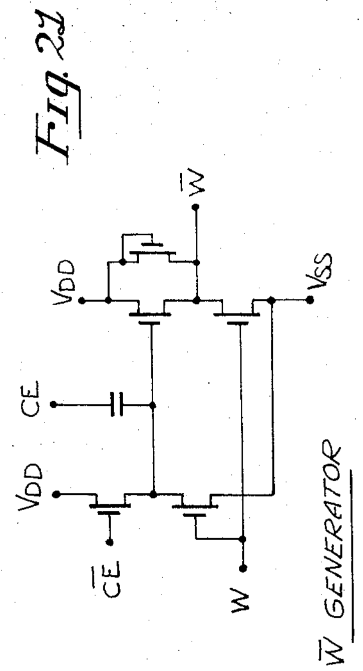
FIG. 21 is a detail circuit diagram of one embodiment of the $\overline{W}$ generator.

As shown in FIG. 2*b*, the R signal, is a sample pulse which commences the internal read cycle with the internal read cycle being complete at approximately at the time of the negative going edge of the pulse R and the positive going edge of pulse $\overline{R}$, at which time the external read commences. The R signal negative going edge moves the column amplifier I/O column line to a low level point at the occurrence of the negative going edge, if the charge is at a certain level at such time in the cell. The $\overline{R}$ signal moves that I/O column line to a high level if the charge in the cell is a predetermined level when $\overline{R}$ becomes positive (up). The internal read is approximately that period from the commencement of the intermediate level voltage of the IVG signal to the time that positive going edge of the $\overline{R}$ signal occurs. The external read is approximately that period during which the $\overline{R}$ signal is positive. It is important to note in FIG. 2A-(*d*) that the R signal is shown in solid and also in dashed lines. The dashed lines indicate that the R signal has a pulse width (e.g., trailing edge) that may vary from monolithic substrate to substrate or within a substrate. Thus, means are employed on the monolithic substrate for varying the pulse width of this signal. Similarly, the timing signal $\overline{R}$ (and IVG, YE, W, etc.) will have a variable pulse width. The variable IVG voltage, provided by the intermediate voltage generator, will have a variable configuration as shown in FIG. 2A-(*f*) by the dashed lines. These pulses and signals are adjusted (as well as other signals) for the variance in device processing and temperature and other variables by timing cell 75 (FIG. 1 and 3*a*) which is shown in detail in FIG. 3*a*. In addition to the timing cell, time-compensating means are employed in a number of the circuits, such as the row decode means 32, 34 and 36 (FIG. 7), the CED driver (FIG. 22), and the ACE buffer (FIG. 19) to compensate for process variables and/or to minimize power dissipation. One form of the time compensating means is shown in FIG. 14 and is described in detail later in the specifications.

Returning to the timing cell as shown in FIG. 3*a*, a timing cell is associated with each row of cells and is coupled to the X-line 20. It is, of course, within the scope of the invention to employ less than or more than a single timing cell with each X-line 20. For example, it may be possible to employ a single timing cell shared by all of the X-lines 20. One of the general purposes of timing cell 75 is to adjust the R, $\overline{R}$ and YE signal to compensate for variances in the memory cell characteristics (e.g., charge and discharge profile) which occurs from substrate to substrate and within the substrate. It should be understood that as the characteristic of a memory cell varies, the discharge of the parasitic capacitance therein will also vary from memory cell to cell and from substrate (e.g., memory system) to substrate (e.g., memory system). Since the reading of a zero or one bit depends upon the discrimination between two levels of voltage which vary with the discharge characteristic and since this discharge characteristic varies as a function time and from substrate to substrate (and slightly from area to area within that substrate), it can be seen that it is critically important that the R and R signals be specifically tailored and timed to the particular characteristic of the memory cell existing on the monolithic semiconductor substrate. It is highly desirable to attain such timing signal adjustability automatically, without regard to any external adjustments of external clocks. It is this automatic adjustment that is provided by the timing cell 75 which, in substance, functions as an adaptive element compensating the timing signals for the particular cell construction and environment automatically. It should be understood that the characteristic of the memory cells vary for numerous reasons, but one of the most significant factors causing such variations is the variation of the process for forming the cell which varies from time to time.

More specifically referring to FIG. 3*a*, the timing cell 75 comprises MOS devices 77 and 79. The device 77 has one of its terminals coupled to the R, $\overline{R}$ and YE generator 110 and the $\overline{YE}$ generator 120, and the other of its terminals is coupled to a terminal of the MOS device 79. The MOS device 79 has another of its terminals coupled to the voltage source $V_{ss}$ with its gate coupled to the source $V_{cc}$. The gate associated with the device 77 is connected to the X or row line 20. The devices 77 and 79, in part, simulate the memory cells 12 with the devices 77 and 79 being counterparts to the devices 16 and 18, respectively. The device 14 of the memory cell, which is primarily employed for writing, is omitted from the timing cell since a writing function is not required in the timing cell. The timing cell is located at one end of a row of cells, in order that it may compensate and take into account propagation delays along the bus line connecting the cells, as well as the process variations, temperature variations and other variables incident to the forming of the monolithic semiconductor substrate and the devices therein.

The timing cell 75 provides a variable output signal, wherein the output signal has a variable slope depending upon the characteristics of the cell which simulates the characteristics of the memory cells. More specifically, the signal provided by the timing cell 75 is shown in schematic form adjacent to the input/output line 81 which is connected to the timing cells. This schematic shows the input/output line 81 being charged to a positive voltage Vcc and at time CED, that is at the time the signal CED goes positive. When CED goes positive the read cycle commences and the line 81 is discharged with a slope or rate of discharge as shown in the region A of the signal schematic (FIG. 3*a*). The discharge of line 81 is dependent upon the characteristics of the timing cell 75. As the characteristics of the timing cell vary from substrate to substrate, or within the substrate, the discharge curve will be altered as typically shown at B. This variable discharge signal is supplied to the timing generator means 100 and specifically the R and $\overline{R}$ generator and YE generator 120 to determine the pulse width of the signals R, $\overline{R}$ and YE as shown in FIG. 2A(*d*) and 2A(*e*). These signals R and $\overline{R}$ are, in turn, employed in the column amplifier 55 and the intermediate voltage generator 40 to participate in the control of the read and write functions.

From the above, it can be seen that the timing cells automatically adjust timing signals to compensate for memory cell variations and to enable precisely timed adaptive signals to be provided for controlling memory system operation. The incorporation of the timing cell on the same substrate memory cell array means contributes to the practicality of incorporating the timing generator on the same substrate. Thus, the present invention makes it possible to incorporate the cell array, timing generator, decode means, buffer registers on a single substrate. Further, the precision timing achieved enables an IVG signal to be employed which facilitates the use of a cell of minimum geometry, interconnects and connecting.

In addition to the timing cell, a timing compensating circuit means is employed in various circuits of the memory system to provide pulse widths and delays adaptive to process variables, temperature and other variables incident to the forming of the monolithic semiconductor substrate and the devices therein. In addition, the time compensating means is employed to minimize power dissipation. one form of this time compensating means is shown in the circuit diagram of FIG. 14 and the accompanying diagram shown in FIG. 15.

Referring to FIG. 14, a circuit is illustrated which may be used for generating internal clock pulses such as those which may be utilized for the write timing pulses and IVG. The circuit includes a monostable circuit; the period of instability of this circuit determines the pulse width of output timing signals. This period is primarily a function of a parasitic capacitor and the conductance of an MOS device. As will be seen, the circuit provides inherent compensation for fabrication differences between substrates.

The input control signal to the circuit is applied to inverter 308; the output of inverter 308 being coupled to one input terminal of the NOR gate 309. The other input terminal to NOR gate 309 is coupled to the output of an inverter 302 by lead 320. The output from NOR gate 309 is coupled to buffer 311; this lead is also coupled to the output terminal 310. The output from buffer 311 is coupled to one terminal of the MOS device 304 and to the gate of the MOS device 300. The other terminal of device 304 and one terminal of device 300 are coupled to ground. The other terminal of device 300 is coupled to one terminal of MOS device 303 and to the input of inverter 302. The other terminal of device 303 is coupled to lead 307 to a source of potential $V_{DD}$. The gates 305 and 306 are coupled to terminals designated as $\overline{CE}$. A capacitor 301 is coupled between ground and node 312; this capacitance in the presently preferred embodiment is the parasitic capacitance between the node 312 and the substrate upon which the circuit of FIG. 14 is fabricated. The circuit of FIG. 15 may be fabricated utilizing MOS technology on said single substrate or chip. In the presently preferred embodiment the MOS devices 300, 303 and 304 are field effects transistors which utilize polycrystalline silicon gates. The inverters 302 and 308, the NOR gate 309 and the buffer amplifier 311 comprise well known logic and buffer circuitry.

Figure 15:
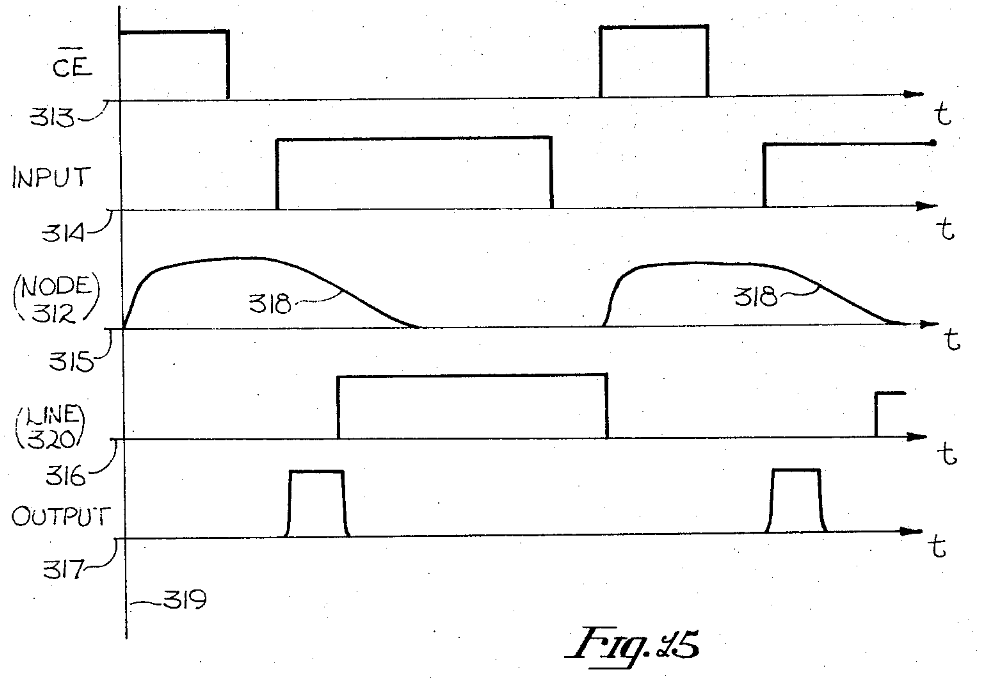
FIG. 15 is a timing diagram for the operation of the timing compensating means shown in FIG. 14.

The operation of the circuit of FIG. 14 may be most readily understood in conjunction with the graph of FIG. 15. In the graph of FIG. 15 the line 313 designates the input to gates 305, and 306, $\overline{CE}$. The line 314 indicates the input signal to inverter 308 which may be an internally generated timing signal or an externally applied timing signal. The waveform shown on line 315 indicates the waveform which would appear at node 312, and the waveform shown on line 316 is the waveform which would appear on lead 320. The output waveform which would appear on lead 310 is shown on line 317 of FIG. 15.

Assume for the purposes of explanation that at time 0 (indicated by line 319 of FIG. 15) the signal designated as $\overline{CE}$ is applied to the gates of devices 303 and 304. When this occurs device 303 will conduct and capacitor 301 is charged to a voltage of approximately $V_{DD}$. Note that since device 304 is conducting the gate of device 300 is at ground potential and hence no conductive path exists from node 312 to ground through that device. Thus, the charge on capacitor 301 will have no readily-conductive path to discharge at this time. The rise in potential at node 312 after time 0 is indicated on line 315 of FIG. 15.

During the time that node 312 is at a potential which approaches $V_{DD}$ the output from inverter 302 will be "low" since the input to the inverter is "high" as indicated on line 316. Also following time 0 since no input signal is applied to the input of inverter 308 its output is "high," thus there will be no output signal from the NOR gate 309 as indicated on line 317 of FIG. 15. When an input signal is applied to the input of inverter 308 as indicated on line 314, the logic to NOR gate 309 is met and an output signal will occur on lead 310 as indicated on line 317 and, additionally, this output signal will cause device 300 to conduct since the signal is coupled to the gate of this device through buffer 311. As device 300 conducts capacitor 301 is discharged through device 300 and the potential at node 312, as shown on line 315 of FIG. 15, approaches ground potential. At a point in time indicated with the numeral 318, the potential applied to inverter 302 will drop sufficiently to cause an output signal on lead 320, as indicated on line 316. Thus, with the embodiment illustrated in FIG. 14, inverter 320 operates basically as a Schmidt trigger and, hence, anyone of numerous Schmidt trigger circuits may be utilized in lieu of inverter 302. When a "high" signal appears on lead 320 the input logic to NOR gate 309 is no longer satisfied and, hence, the output signal on lead 310 drops to its "low" state. It should be noted that the pulse width of the signals shown line 317 is a direct function of the rate at which capacitor 301 discharges through device 300.

Since the rate at which capacitor 301 discharges through device 300 is a function of the conductance of that device, the pulse width of the output signal can be determined by or made a function of the geometry of device 300 in addition to other parameters such as the capacitance of parasitic capacitor 301. In the presently preferred embodiment, the pulse width is varied by varying the ratio of $z/l$ where $z$ and $l$ are the width and length, respectively, of the channel associated with device 300. For example, if the ratio $z/l$ is made larger by either making the channel width greater and/or the length shorter, capacitor 301 will discharge more quickly and a narrower output pulse on lead 310 will result. Similarly, if the ratio $z/l$ is decreased by making a narrower channel and/or a longer channel, capacitor 301 will discharge more slowly and, hence, the pulse width of the output pulse will be increased. Thus, the desired pulse width may be designed into the circuit.

In fabricating field effect devices utilizing MOS technology, variations often exist from chip to chip in the threshold values of the devices on a given chip. However, the devices on any given chip generally vary from the norm in the same direction and by approximately the same amount. Because of these variations from chip to chip it becomes in some instances difficult to utilize timing pulses having a constant pulse width. For example, a given pulse width applied to a chip where the threshold voltages are generally lower (and the circuits faster) will achieve a different result than on a chip where the threshold voltages are generally higher and where the devices are somewhat slower responding.

Assume that the circuit of FIG. 14 is fabricated on an MOS chip where the threshold levels of the circuitry on that chip are generally lower. This will mean that device 300 will also have a lower threshold and, hence, will discharge more quickly resulting in a narrower pulse width on the output lead 310. It should be noted that since the remaining circuitry on the chip is somewhat faster, due to the lower thresholds a shorter pulse width is desirable. On the other hand, if the circuit of FIG. 14 is fabricated on a chip where the thresholds are somewhat higher than the norm, device 300 will also have a higher threshold, and hence, capacitor 301 will discharge more slowly. This will result in wider output pulse (lead 310) that will compensate for the slower circuits on that chip. Thus, by using the timing circuit shown in FIG. 15, an automatic compensation is achieved for variations between chip to chip. It has also been found that the circuit compensates for masking variations from chip to chip.

Figure 22:
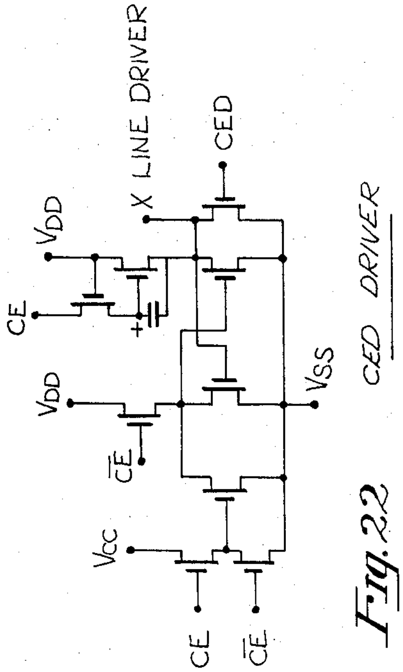
FIG. 22 is a detail circuit diagram of one embodiment of the CED driver.

With the basic system described above, the general operation of the system will now be described with reference to FIGS. 1, 3*a*, 3*b* and 2A. The operation of the system will be described for a typical read cycle with the primary signals those shown in the FIG. 2A. To commence the read cycle, a CE signal is received from an external clock source as shown in FIG. 2A(*b*). It is supplied to the timing generator 100, as well as numerous other particular detail circuits within the system as shown in the various detail circuit diagrams, FIGS. 7–22. The CE signal results in the generation of the $\overline{\text{CE}}$ signal, which is also supplied to timing generator 100, and is shown in FIG. 2A(*c*). The timing generator 100 supplies the output signal YE to the column decode and driver 60 to enable the address supplied to the address buffer register 80 (at approximately the same time that the CE signal is supplied to the timing generator 100) to be decoded. The address buffer register 80 is decoded by the column decode 60 and row decode 30, which decoding, in turn, selects a particular cell from memory cell array means 10. The decode period extends approximately from the time of the positive going edge of the CE signal to the time of output signal of the intermediate voltage generator 40 moves from a low level to an intermediate level. This change in voltage by the intermediate voltage generator 40 occurs at approximately the time of the positive going edge of the signal CED which signal is supplied by the CED driver (FIG. 22). The timing of the CED signal is determined by the signals CE and $\overline{\text{CE}}$, along with the time compensating circuit (FIG. 14) contained in CED, which enables the CED signal to vary in accordance with the solid and dashed lines shown in FIG. 2A(*i*). This variance of the CED signal, in turn, causes the output voltage from the intermediate voltage generator to vary the time at which such output voltage moves from a low to an intermediate level, as shown in FIG. 2A(*f*). Thus, the decode period will vary accordingly.

Once the decode is completed and the intermediate voltage is supplied by the intermediate voltage generator 40 to the selected memory cell, then the internal read cycle commences and the selected memory cell 12 is read as previously described in the detailed description relating to the memory cells. The internal read cycle is completed approximately at the time of the positive going edge of the $\overline{\text{R}}$ bar signal (and the negative going edge of the R signal) at which time the external read cycle (and restore) is commenced. It should be noted that the internal read cycle is also a period which is varied in accordance with the solid and dashed lines shown in FIGS. 2A(*d*) (*e*) and (*f*). This variation of the internal read cycle, that is the negative going edge of the R signal and the positive going edge of the $\overline{\text{R}}$ signal, is accomplished by the timing cell 75 coupled to the timing generator 100.

The positive going edge of the $\overline{\text{R}}$ bar signal supplied by the time generator 100 to the intermediate voltage generator 40 causes the intermediate voltage generator to move to a high level. It should be recalled that about this time the R and $\overline{\text{R}}$ signals supplied to the column amplifier enable the column amplifier 55 to sense the existence of a charge or no charge in the selected memory cell and supply a high or low output signal to the data control cell 97 in cooperation with the control bit amplifier. The control bit amplifier in one form, stores the read information in complement form in data control cell 97, which information is then transferred to the input/output circuits 93 (typically shown in FIGS. 9, 12 and 13). It should be noted that employing the compliment technique facilitates the construction and operation of the column amplifier so that the external read cycle takes place in relatively short periods of time with the intermediate voltage generator operating at a high level for a minimum period of time, thus minimizing the power dissipation. It is within the scope of the invention to employ other than a compliment information transfer technique. It can be seen from FIG. 2A(*h*) that the data output is then supplied to the output terminal. Thus, the information is read out in a typical cycle.

Certain of the timing signals supplied during the read-modify-write cycle are shown in FIG. 2B. It should be noted that a portion of this cycle is substantially identical to the read cycle, since a read operation is first performed and then a write-modify operation takes place. Briefly, in addition to the signals supplied for a read cycle during this cycle, a logic or informational signal R/W is supplied to the W generator (FIG. 16) to generate the signal W shown in FIG. 2B. The signal W is supplied to the input/output circuit 93 and to the timing generator 100 and specifically to the R and $\overline{R}$ Generator. This signal W enables another cycle of the R and $\overline{R}$ signal to be generated while there is no additional positive going edge of the CED signal generated. It will be recalled that the CED signal initiated the moving of the output voltage of the intermediate voltage generator 40 from a low level to an intermediate level. The absence of the CED signal after the read operation is accomplished and the presence of another R and $\overline{R}$ signal enables the intermediate voltage generator to move from a low level to a high level. It is this high level signal of the intermediate voltage generator, along with the timing signal W generated on the substrate that enables the write modify operation to be accomplished following the read cycle. The other signals supplied, of course, take part in the overall operation of the system, but such details are not specifically important to the present invention and may be understood from the diagrams and description herein by one of ordinary skill in the art.

In summary, it should be appreciated that the entire system and circuitry shown in FIGS. 1 – 22 is included on a single monolithic substrate which received a single external clock signal to operate the system. One typical memory system built in accordance with the present invention was placed on a monolithic substrate approximately 0.140 × 0.170 inches, which substrate contains approximately 15,000 components. An exemplary system built in accordance with this invention had the following estimated characteristics:

4,096 Bits; 4,096 words by 1 Bit
TTL Compatible Inputs (except clock)
Single clock Input (high level)
Cell Size < 2 mil$^2$ (3 transistor)
Access time < 300ns
Cycle time < 500 ns
Active power < 100 $\mu$ w/bit
Power supplies: +12V, +5V, −5V
Standby Power 1$\mu$w/bit
Standard 22 pin package It is within the scope of the invention to employ the described invention in less complex systems containing bits of information and fewer components and to apply the invention to other forms of memory systems other than the specific and detailed one described hereinabove.

While the specific details of the other circuits drawn are not important to the present invention, for the purpose of completeness, certain circuits will be briefly described below.

IVG GENERATOR

The IVG generator illustrated in FIG. 4 provides an output control signal which is coupled to the X-lines of the memory cells through the X-line drivers 36. The IVG output control signal includes a second (intermediate) DC level for controlling the read cycle, followed by a higher second (high) DC level for controlling the external read and restore cycle, and after a period of no control signal, provides a signal equal in magnitude and duration to the high DC level for controlling the write cycle. The intermediate level of the IVG signal is generated by the circuitry of FIG. 4 shown to the left of the IVG output line while the first high level and second high level are generated by the circuitry shown to the right of the IVG output line.

MOS devices 325, 326, 327 and 328 are utilized as a "bleeding" network for providing a DC level at node 330. This DC potential is utilized to control the magnitude of the IVG signal during the read cycle. The MOS devices 330, 331, 332 and 333 provide high resistance loads for devices 325 through 328, respectively, while devices 334 and 335 form a voltage divider network for controlling the gate of device 330. The MOS devices 336, 337 and 338 form a voltage divider network and provide a voltage at node 330a which is inversely proportional to the voltage at node 330. MOS device 337, which has its gate coupled to the CE signal is used to intercept the current path through devices 336, 337 and 338 in order to conserve power since the IVG signal is only generated when the CE signal is in a "high" or "on" state. The DC level from node 330*a* is transferred to node 330*b* through MOS device 340 and then to the IVG line (node 330*c*) through device 341.

At the time a CED signal is received on lead 339 the voltage on the IVG line 330c begins to rise and is finally checked at a DC level by the feedback provided through devices 342 and 343. MOS device 334 is utilized to precondition node 345 to ground during $\overline{CE}$ time.

The DC level established at node 330 will be a function of the threshold levels for devices 325, 326, 327 and 328 and hence will vary from chip to chip. By way of example, if the threshold levels are high for these devices the voltage at node 330 will be low and the voltage at node 330a will be high. The higher voltage at node 330a will be transferred to the IVG line, resulting in a higher output IVG signal during the read cycle, which is the desirable condition for a substrate where the thresholds are high. Thus, the MOS devices 325, 326, 327 and 328 compensate the amplitude of the read signal for variations in thresholds from substrate to substrate.

The beginning of the high level of the IVG signal is initiated by the application of the $\overline{R}$ signal to node 350 through device 352 and capacitor 351. Capacitor 351 in the presently preferred embodiment comprises an MOS device wherein the gate is utilized as the positive terminal of the capacitor and the source and drain terminals are common and are utilized for the negative terminal of the capacitor. The DC level on node 350 is transferred through device 353 to the IVG line and the signal on the IVG line immediately begins to rise. As this occurs the feedback through devices 342 and 343 in effect cuts off the signal previously supplied to the IVG line from the circuit shown to the right of the IVG line.

The pulse width of the high portion of the IVG signal is determined by the capacitance from node 54 to the substrate and the rate of discharge of this node through device 355. This node is first precharged through device 356 and on the application of the $\overline{R}$ signal to device 357 begins to discharge. As discharging occurs, device 358 will cease to conduct and node 359 will rise in potential. The rise in potential on node 359 causes devices 360 and 361 to conduct, thereby forcing the IVG line to ground potential. Note that device 362 is used to precondition node 364 to ground during the P signal while device 363 is used to precondition the IVG line to ground also during this P signal.

The third section, that is, the second occurrence of a high level of the IVG signal, which is the section that controls the write cycle, is initiated by the second $\overline{R}$ signal (FIG. 2B), this second section being generated by the R and $\overline{R}$ generator in response to the leading edge of the W or write signal. Upon receipt of the second portion of the $\overline{R}$ signal a pulse is again generated on the IVG signal in the same manner as the restore and external read section of the IVG signal previously discussed.

DECODER

Figure 7:
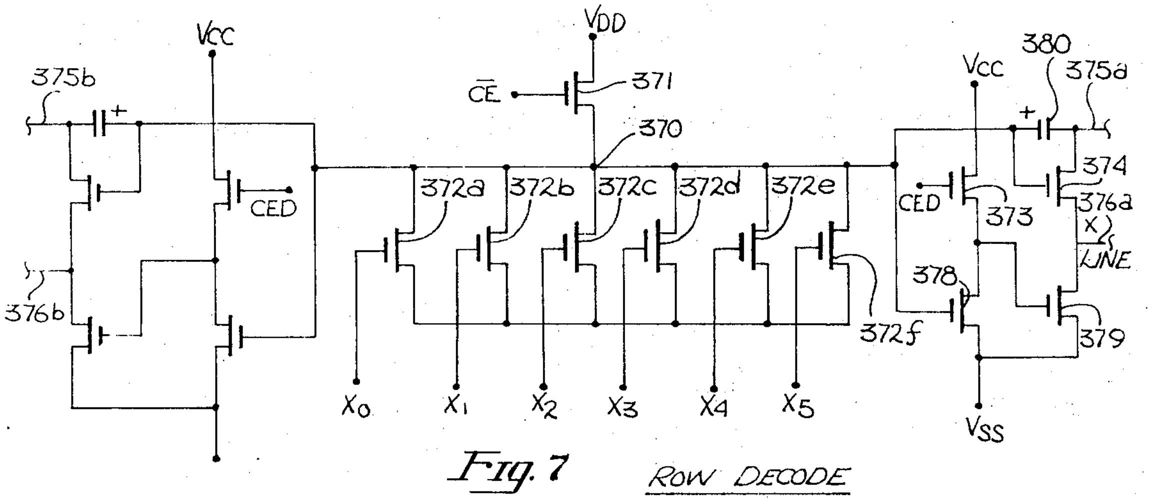
FIG. 7 is a detail circuit diagram of one embodiment of the row decode and driver.

Referring to FIG. 7, a row decoder which includes a NOR gate such as NOR gate 32, a paid of X-line drivers such as X-line drivers 36, a MOS device such as MOS device 34, all of FIG. 3*a*, is illustrated. The X-line drivers, one of which is shown on each side of the NOR gate, receive an IVG input on leads 375*a* and 375*b* and produce an output signal coupled to the X-lines as shown by leads 376*a* and 376*b*. In the row decoder the NOR gate is a preconditioned NOR gate with a preconditioning signal approximately equal to $V_{DD}$ being applied to node 370 through MOS device 371 when the $\overline{CE}$ signal causes device 371 to conduct. As is readily apparent, whenever a "high" signal is received on the X-lines $X_0$ through $X_5$, one of the devices 372*a* through 372*f* will conduct, causing node 370 to be pulled to ground potential ($V_{SS}$).

In the driver portion of the decoder of FIG. 7 capacitor 380 and MOS device 374 are utilized to couple the IVG signal from the IVG generator to the X-line whenever node 370 is charged. A capacitor 380 and the device 374 form a bootstrap circuit when capacitor 380 is charged, which tends to drive the gate of device 374 to a higher potential and at a faster rate when the IVG signal is present on lead 325*a*. In the presently preferred embodiment the capacitor 380 comprises an MOS device with its gate forming the positive terminal of the capacitor and its source and drain being common and utilized as the negative terminal of the capacitor. Devices 373, 378 and 379 are utilized to prevent the X-line, lead 376*a*, from floating when node 370 is discharged. The X-line driver shown in FIG. 7 to the left of MOS device 372*a* operates in the same manner as the driver shown to the right of device 372*e*.

Figure 8:
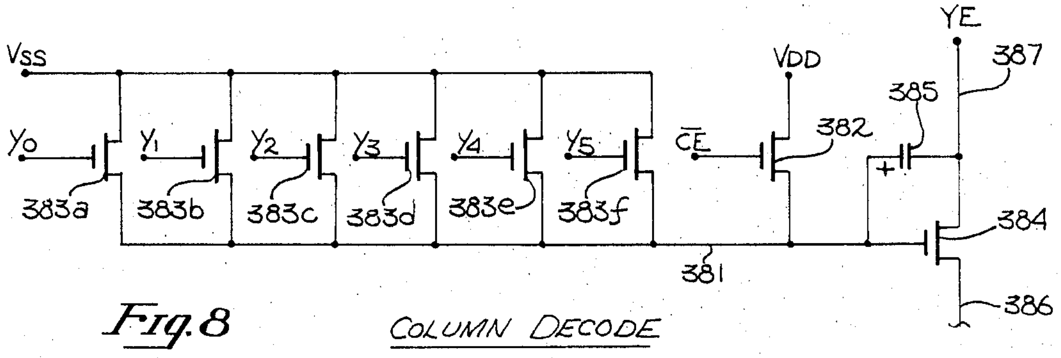
FIG. 8 is a detail circuit diagram of one embodiment of the column decode and driver.
Figure 9:
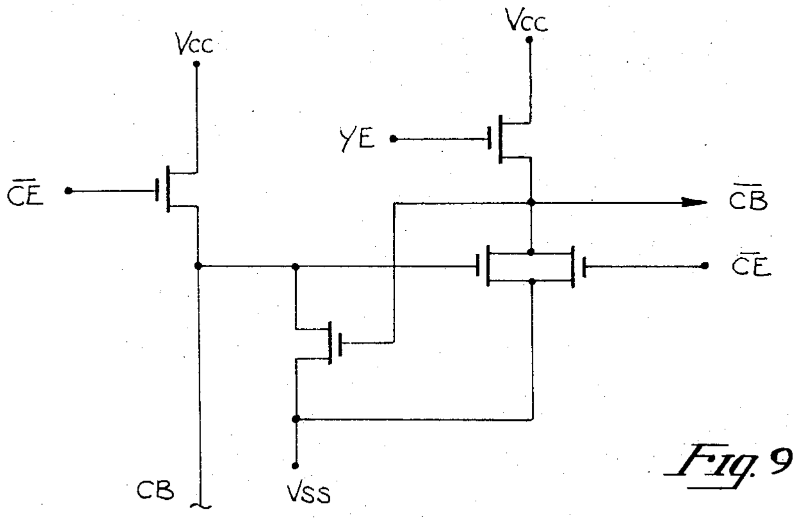
FIG. 9 is a detail circuit diagram of one embodiment of the control bit inverter.

Referring to FIG. 8, a column decoder such as the column decoders shown in FIG. 3*a*, is illustrated. The column decoder includes a preconditioned NOR gate similar to the NOR gate of FIG. 7 in which node 381 is preconditioned through device 382 to a voltage approximately equal to $V_{DD}$ when the $\overline{CE}$ signal is applied to device 382. If a signal is applied to leads $Y_0$ to $Y_5$ of devices 383*a* through 383*f*, respectively, node 381 will be pulled to a $V_{SS}$ potential thus preventing conductance between leads 386 and 387, the YE line. The driving circuit which comprises device 384 and capacitor 385 operates as a bootstrap circuit in the same manner as devices 374 and capacitor 380 of FIG. 7.

COLUMN AMPLIFIER

Figure 5:
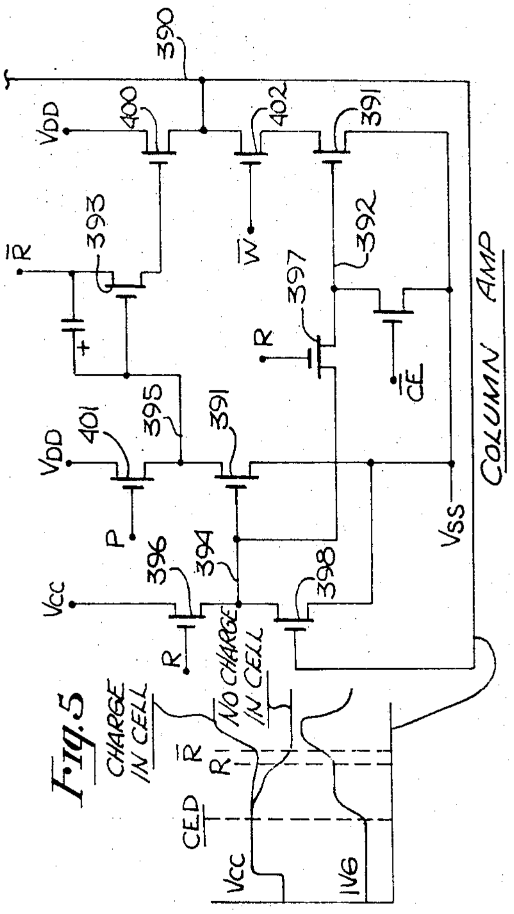
FIG. 5 is a detail circuit diagram of one embodiment of a control amplifier.

Referring to FIG. 5, a column amplifier is illustrated which may be utilized for the column amplifiers shown in FIG. 3a and which are coupled to the Y-lines of the memory cells. Line 390 of the column amplifier is the input and output of the amplifier; this line is charged to a potential approaching $V_{CC}$ when the $\overline{CE}$ signal is high. At CED time if a charge exists on the parasitic capacitance or storage element of a selected memory cell coupled to line 390 the charge on lead 390 will flow through the memory cell and hence the potential of lead 390 will drop. On the other hand, if no charge exists on the parasitic capacitance of the selected cell the charge on the line 390 will discharge at a comparatively slow rate when the CED signal goes high.

Prior to the beginning of a cycle when the $\overline{CE}$ signal is high, node 392 will be preconditioned to $V_{SS}$ potential and likewise node 395 will be preconditioned to $V_{DD}$ by the P signal applied to device 401. Since line 390 is charged at the beginning of a cycle device 398 will be conductive and node 394 will also be preconditioned to the $V_{SS}$ potential. At the time that the $\overline{CE}$ signal goes low and the R signal becomes high, devices 396 and 397 are turned on by the R signal. When the CED signal goes high, either lead 390 is rapidly discharged or it is very slowly discharged as previously mentioned. If the lead is rapidly discharged device 398 becomes less conductive, causing node 394 to rise in potential since device 396 is conducting. This, in turn causes node 392 to rise in potential since device 397 is also conducting. If, in fact, nodes 392 and 394 rise in potential the line 390 will be sharply brought to $V_{SS}$ potential because of the positive feedback through device 391. Note during the portion of the cycle being discussed device 402 is conducting since it is coupled to a $\overline{W}$ signal. Device 402 is utilized to uncouple the feedback loop through device 391 during the write cycle.

If at the time the R signal goes low and the $\overline{R}$ signal goes high, line 390 has not been brought to $V_{SS}$ potential through devices 402 and 391, line 390 is brought to $V_{DD}$ potential since the $\overline{R}$ signal will cause device 393 to conduct, thereby coupling line 390 to $V_{DD}$ through device 400. Thus, if the charge on line 390 beginning at CED time discharges rapidly through the selected memory cell, line 390 will be sharply brought in to the $V_{SS}$ potential prior to the time that the $\overline{R}$ signal goes high. On the other hand, if line 390 is not brought to the $V_{SS}$ potential prior to the time that the $\overline{R}$ signal goes high, it will be brought to the $V_{DD}$ potential at $\overline{R}$ time.

YE GENERATOR

Referring to FIG. 11, the YE generator is illustrated with its output lead designated as lead 450. Prior to the beginning of a cycle the lead 451, which couples device 452 to the timing cell of FIG. 3*a* is initially pprecharged to $V_{CC}$ through device 453. When the CE signal is low and the $\overline{CE}$ signal is high no signal will exist on lead 450 since device 455 will be conducting. thereby causing device 456 to couple lead 450 to $V_{SS}$, and also since node 454 is low thereby assuring that device 458 is not conducting. When the charge on lead 451 decays due to the timing cell, device 452 ceases to conduct. Since this occurs at the time when CE is high the junction 454 begins to rise, thereby coupling the gate of device 456 to ground through device 458. (At this time it should be noted that $\overline{CE}$ is low, thus device 455 is not conducting). As this occurs, line 450 rises to a $V_{DD}$ potential since devices 460 and 461 are conducting. When the CE signal again changes to its low state and the $\overline{CE}$ signal rises the signal on lead 450 again returns to its low state. In the circuit of FIG. 11 device 462 is utilized to precondition node 457 and device 461 is likewise used to precondition node 463.

R AND $\overline{R}$ GENERATOR

Figure 10:
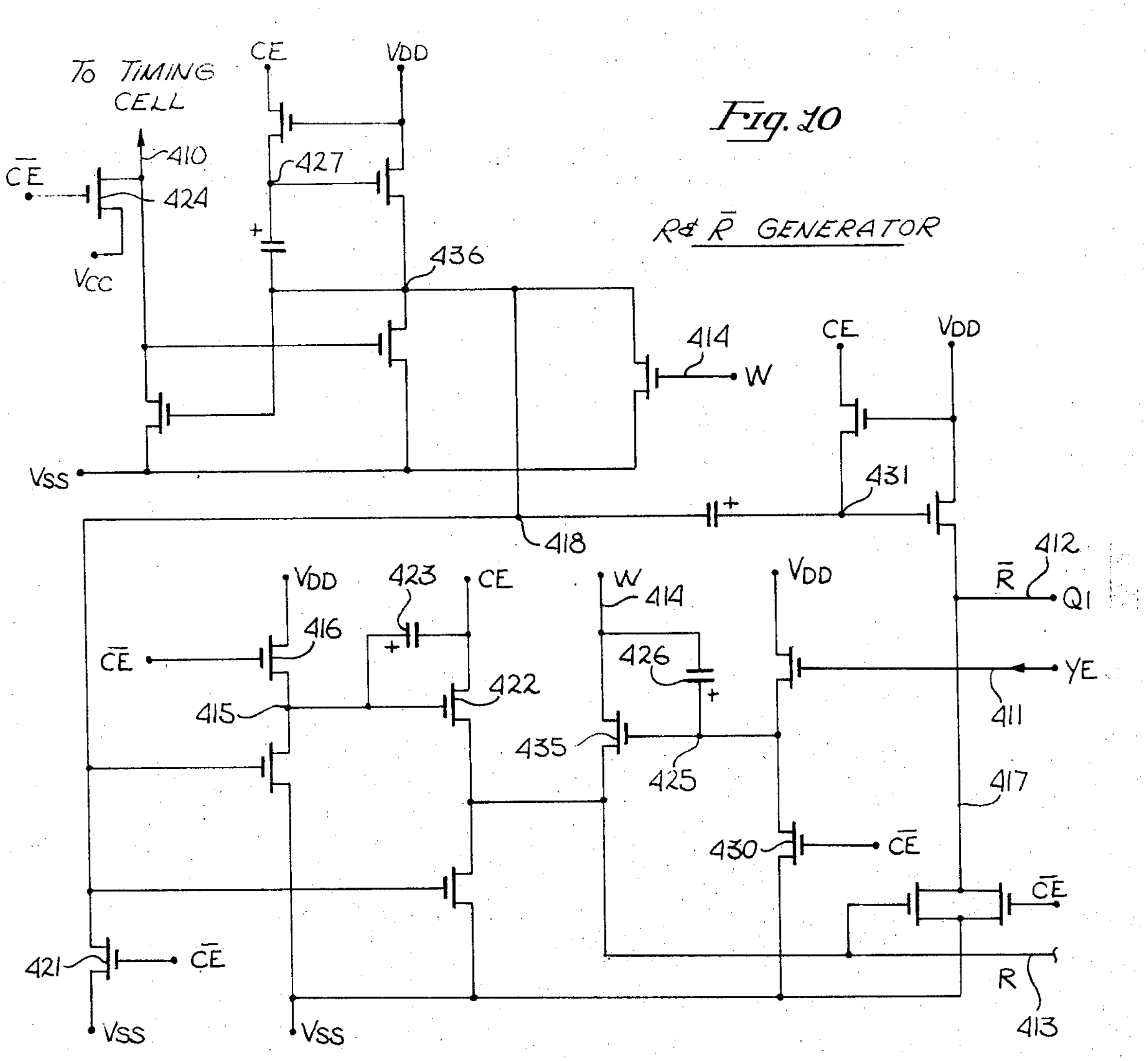
FIG. 10 is a detail circuit diagram of one embodiment of the R and $\overline{R}$ generator.

Referring to FIG. 10, an R and $\overline{R}$ generator such as the one shown in FIG. 3a is illustrated. This circuit generates the R and $\overline{R}$ signals primarily from the CE signal, the signal from the timing cells shown in FIG. 3a and also from the W signal, although other signals such as the YE signal and $\overline{CE}$ signal are utilized for preconditioning various nodes of the generator. The generator is basically a logic network which utilizes the bootstrap circuits discussed in conjunction with the row decoder of FIG. 7.

Prior to the beginning of a cycle the $\overline{CE}$ signal preconditions node 415 through device 416 to a voltage approximately equal to $V_{DD}$, The preconditioning of this node is utilized to charge capacitor 423; this capacitor in conjunction with device 422 forms one of the bootstrap circuits utilized in the generator and which was previously discussed in conjunction with FIG. 7. Additionally, the $\overline{CE}$ signal preconditions node 418 to $V_{SS}$ ground potential, through device 421. Also, line 410, which is coupled to the timing cells, is preconditioned to a voltage of $V_{CC}$ through device 424 and node 425 is preconditioned to $V_{SS}$ through device 430.

At the time the CE signal goes high, device 422 conducts causing a signal to appear on the R-line, line 413. Also at this time nodes 427 and 431 are preconditioned. Following the time when the CE signal goes high, the timing cell causes the charge on lead 410 to decay. It should be noted that the decay of the signal caused by the timing cells is triggered from the X-drive lines of the cells to take into account any propagation delay or processing delays in selecting cell or cells in the array. Once the charge on lead 410 decays sufficiently it causes the $\overline{R}$, line 412, to rise in potential and the R signal to drop to $V_{SS}$. Following this, the YE signal on lead 411 precharges node 425 to $V_{DD}$ potential; this potential precharges capacitor 426 which forms part of a bootstrap circuit with the device 435. When the W signal appears on lead 414 it causes node 436 to drop to ground potential and device 435 to conduct, and also causes device 435 to conduct. This results in the R signal going to its high state and the $\overline{R}$ signal falling in potential.

Other circuits have not been generally discussed. These circuits are either readily understandable from the figures, well known in the art or unimportant in the present invention.

We claim:

1. A semi-conductor memory system for electrically storing information comprising memory cell array means for storing a plurality of bits of information formed on a monolithic semi-conductor substrate, said array comprising a plurality of memory cells, each cell capable of storing a bit of information;

address buffer means for receiving address information inputs and for providing an output representative of a selected address;

decode means coupled to the output of said address means and to said memory cell array means for generating a signal to select the addressed portion of said memory cell array means; and timing generator means for generating a plurality of timing signals to control the operation of said array means; said timing generator means formed on said monolithic semi-conductor substrate containing said array means, said timing generator means providing said timing signals upon the receipt of an external clock signal.

2. The structure recited in claim 1, wherein a single external timing signal is received by said timing generator means.

3. The structure recited in claim 2, wherein said memory cell array means, said address means, said decode means and said timing generator means are formed on a single monolithic semi-conductor substrate.

4. The structure recited in claim 3, wherein said semiconductor memory system is an MOS dynamic memory system.

5. A structure recited in claim 4, wherein said memory cell of said memory array cell means employs three MOS transistors interconnected for selection through a single select line during reading and writing and interconnected to a single column line to allow transfer of information into and out of the cell, and interconnected to a single ground line shared between two adjacent columns of cells.

6. The structure recited in claim 5, wherein an intermediate voltage generator means is coupled to said decode means for providing a tri-state signal having a low level, an intermediate level and a high level, said intermediate level for enabling the reading of the selected portions of said memory cell array means and said high level enabling the writing and refreshing of said memory cell array means.

7. The structure recited in claim 1, including a timing cell means coupled to said time generating means and said memory cell array means for determining the general characteristics of the memory cell means, and for adjusting the timing signals provided by the timing generator means.

8. The structure recited in claim 6, including a timing cell means coupled to said time generating means and said memory cell array means for determining the general characteristics of the memory cell means, and for adjusting the timing signals provided by the timing generator means.

9. The structure recited in claim 7, including a timing cell means coupled to said time generator means and said memory cell array means for determining the general characteristics of the memory cell means and for adjusting the timing signals provided by the time generator means.

10. A semiconductor memory system for electrically storing information comprising memory cell array means for storing a plurality of bits of information, said array means formed on a monolithic semiconductor substrate, and comprising a plurality of memory cells, each cell capable of storing a bit of information;

address buffer means for receiving address information input and for providing an output signal representative of a selected address;

decode means coupled to the output of said address means and to said memory cell array means for generating a signal to select the addressed portion of said memory cell array means;

timing generator means for generating a plurality of timing signals to control the operation of said array means; said timing generator means formed on said monolithic semi-conductor substrate containing said array means, said timing generator means providing said timing signals upon the receipt of an external clock signal; and time compensating circuit means formed on said monolithic semiconductor substrate and coupled to said memory cell array means for compensating timing signals for variations in said devices formed on monolithic semiconductor substrate.

11. The structure recited in claim 4 wherein said address buffer means includes a register for storing address information.

12. The structure recited in claim 7 wherein said timing cell means includes a plurality of timing cells with one timing cell being coupled to each row of said memory cells.

13. The structure recited in claim 12 wherein each of said timing cells are disposed at approximately the end of each of said rows.

14. The structure recited in claim 12 wherein each of said memory cells comprises a first MOS device and second MOS device.

15. The structure recited in claim 14 wherein said first and second MOS device are coupled in series with the gate of said first MOS device being coupled to one of said rows and one of the other terminals of each of said first MOS device being coupled to a common line.

16. The structure recited in claim 15 including means for charging said common line.

17. The structure recited in claim 16 wherein said timing generator means includes means for sensing said charge on said common line and for adjusting at least one of said timing signals in response to said sensed charge on said common line.

18. The structure recited in claim 9 wherein said timing cell means includes a plurality of timing cells coupled to rows of said memory cells.

19. The structure recited in claim 18 wherein said plurality of timing cells are coupled to a common line.

20. The structure recited in claim 19 including means for charging said common line.

21. The structure recited in claim 20 wherein said timing generator means includes means for sensing the charge on said common line wherein said adjusting of said timing signals is a function of said charge on said common line.

22. The structure recited in claim 9 wherein said timing cell means includes a plurality of timing cells each of which includes a pair of MOS devices coupled in series.

23. The structure recited in claim 22 wherein one of said MOS devices of each of said timing cells has its gate coupled to a row of said memory cells.

* * * * *